US009592627B2

(12) United States Patent
Haynes et al.

(10) Patent No.: US 9,592,627 B2
(45) Date of Patent: Mar. 14, 2017

(54) FORMING METHODS

(71) Applicant: Manufacturing Systems Limited, Whangaparaoa, Auckland (NZ)

(72) Inventors: Andrew Leo Haynes, Red Beach (NZ); Christopher John Nicholls, Northshore (NZ)

(73) Assignee: Manufacturing Systems Limited, Auckland (NZ)

( * ) Notice: Subject to any disclaimer, the term of this patent is extended or adjusted under 35 U.S.C. 154(b) by 0 days.

(21) Appl. No.: 14/976,962

(22) Filed: Dec. 21, 2015

(65) Prior Publication Data

US 2016/0185018 A1 Jun. 30, 2016

Related U.S. Application Data

(62) Division of application No. 13/123,176, filed as application No. PCT/NZ2009/000214 on Oct. 7, 2009, now Pat. No. 9,242,396.

(30) Foreign Application Priority Data

Oct. 7, 2008 (AU) ................................ 2008905211

(51) Int. Cl.
*B29C 43/44* (2006.01)
*B29C 43/58* (2006.01)
(Continued)

(52) U.S. Cl.
CPC ............ *B29C 43/58* (2013.01); *B29C 43/222* (2013.01); *B29C 43/24* (2013.01); *B29C 43/305* (2013.01);
(Continued)

(58) Field of Classification Search
CPC ....... B29C 43/22; B29C 43/222; B29C 43/44; B29C 43/48; B29C 47/004; B29C 47/059;
(Continued)

(56) References Cited

U.S. PATENT DOCUMENTS 2,764,193 A 9/1956 Knowles
3,776,679 A 12/1973 Hegler
(Continued)

FOREIGN PATENT DOCUMENTS

CN 2642497 9/2004
CN 1644340 7/2005
(Continued)

*Primary Examiner* — Timothy Kennedy
(74) *Attorney, Agent, or Firm* — Foley & Lardner LLP

(57) ABSTRACT

This invention relates to methods for forming a polymer, including continuously depositing a polymer extrudate that is above its glass transition temperature onto a lower molding surface of a first mold in a manner that reduces shear stress in the polymer extrudate, heating the lower molding surface to maintain the polymer extrudate above the glass transition temperature, applying an upper molding surface of a second mold to at least the exposed upper surface of the polymer, allowing the polymer to transition to below the glass transition temperature while within or between the upper and lower molding surfaces, and providing heat sinks spaced relative to each other through the pressure forming zone, wherein a heat sink more advanced through the pressure forming zone is controlled to a lower temperature to progressively reduce the temperature of the polymer as it advances through the pressure forming zone.

96 Claims, 17 Drawing Sheets

(51) Int. Cl.

| | | |
|---|---|---|
| *B29C 43/22* | (2006.01) | |
| *B29C 43/30* | (2006.01) | |
| *B29C 47/88* | (2006.01) | |
| *B29C 43/24* | (2006.01) | |
| *B29C 43/52* | (2006.01) | |
| B29C 47/00 | (2006.01) | |
| B29C 47/06 | (2006.01) | |
| B29C 47/14 | (2006.01) | |
| B29C 43/02 | (2006.01) | |

(52) U.S. Cl.
CPC .......... *B29C 43/52* (2013.01); *B29C 47/0021* (2013.01); *B29C 47/0038* (2013.01); *B29C 47/885* (2013.01); *B29C 47/8885* (2013.01); B29C 47/0019 (2013.01); B29C 47/0033 (2013.01); B29C 47/0047 (2013.01); B29C 47/0054 (2013.01); B29C 47/065 (2013.01); B29C 47/145 (2013.01); B29C 2043/025 (2013.01); B29C 2043/522 (2013.01); B29C 2043/5816 (2013.01); B29C 2043/5875 (2013.01); B29K 2995/0072 (2013.01); Y10T 428/24355 (2015.01)

(58) Field of Classification Search
CPC ............ B29C 47/0061; B29C 47/0069; B29C 59/043; B29C 2043/025; B29C 2059/023
USPC .............. 425/326.1, 115, 223, 335; 264/212, 264/172.19, 177.16
See application file for complete search history.

(56) References Cited

U.S. PATENT DOCUMENTS

| | | | |
|---|---|---|---|
| 4,021,178 A | 5/1977 | Braun | |
| 4,212,618 A | 7/1980 | Hegler et al. | |
| 4,319,872 A | 3/1982 | Lupke et al. | |
| 4,381,276 A | 4/1983 | Hegler et al. | |
| 4,449,910 A | 5/1984 | Leloux | |
| 4,789,322 A | 12/1988 | Chan et al. | |
| 4,956,140 A | 9/1990 | Rolles et al. | |
| 5,028,372 A | 7/1991 | Brierre et al. | |
| 5,053,180 A | 10/1991 | Wang et al. | |
| 5,167,781 A | 12/1992 | Kemerer et al. | |
| 5,320,797 A | 6/1994 | Hegler et al. | |
| 5,330,341 A | 7/1994 | Kemerer et al. | |
| 5,330,595 A | 7/1994 | Held | |
| 5,458,477 A | 10/1995 | Kemerer et al. | |
| 5,582,849 A | 12/1996 | Lupke | |
| 5,843,504 A | 12/1998 | Kobussen et al. | |
| 6,457,965 B1 | 10/2002 | Hegler | |
| 6,644,951 B2 | 11/2003 | Lupke et al. | |
| 6,908,295 B2 | 6/2005 | Thielman et al. | |
| 7,207,791 B2 | 4/2007 | Hofmann | |
| 2002/0025355 A1 | 2/2002 | Lupke et al. | |
| 2007/0262049 A1 | 11/2007 | Miyajima et al. | |
| 2010/0173036 A1 | 7/2010 | Haynes et al. | |
| 2013/0320591 A1 | 12/2013 | Haynes et al. | |

FOREIGN PATENT DOCUMENTS

| | | |
|---|---|---|
| FR | 2565155 | 12/1985 |
| GB | 1 221 127 | 2/1971 |
| GB | 2 134 844 | 8/1984 |
| JP | 62-048524 | 3/1987 |
| JP | 62-181112 | 8/1987 |
| JP | 02-014122 | 1/1990 |
| JP | 11-000927 | 1/1999 |
| JP | 11-000928 | 1/1999 |
| JP | 2000-296544 | 10/2000 |
| JP | 2003-067625 | 3/2003 |
| JP | 2003-288635 | 10/2003 |
| JP | 2003-347042 | 12/2003 |
| JP | 2007-112988 | 5/2007 |
| WO | WO-95/00025 | 1/1995 |
| WO | WO-02/096614 | 12/2002 |
| WO | WO-2007/058548 | 5/2007 |
| WO | WO-2007/058549 | 5/2007 |

FORMING METHODS

CROSS-REFERENCE TO RELATED PATENT APPLICATIONS

This application is a divisional of and claims priority to U.S. patent application Ser. No. 13/123,176, entitled "Forming Methods," filed on Aug. 9, 2011, which is a national stage entry of PCT/NZ2009/000214, filed on Oct. 7, 2009, which claims priority to Australian Patent Application No. 2008905211, filed on Oct. 7, 2008, each of which are incorporated herein by reference in their entirety and for all purposes.

FIELD OF THE INVENTION

The present invention relates to forming methods, more particularly, though not solely, to a method of forming or fabricating superfine structures or nanostructures or both.

BACKGROUND

Mass production forming or fabricating of nanostructures or microstructures, such as any manufactured structure having a scale between molecular and microscopic, presents challenges to existing forming techniques.

For example, an item or a precursor to an item manufactured in a forming process, such as by injection moulding, may have been formed in a stressed material state. The forming process itself imparts stresses such as deformation stress, shear stress, flow stress and temperature stress to the material or item thus formed. Generally, in existing forming techniques the greater the speed of production the more stress tends to be imparted in to the formed product. Traditionally, these stresses are increased greatly when attempting to mass produce products.

Further disadvantages of forming products have included the subsequent deformation of an imprinted or formed item or product surface by the heat remaining in the material following a forming step. The heat transfer rates may impact on the length of time taken for the item or product to cool and the imprinted shape to hold its pattern.

It would be beneficial if an item or a precursor material for forming an item can be manufactured or fabricated in a manner that minimises or reduces the problems associated with formation stresses or stresses that may become locked up in the item due to the variations in temperature across an item during a forming process. Reducing or minimising overall shrinkages of forming an item to a near net shape also provides for manufacturing efficiencies.

It would therefore be significantly advantageous to be able to mass produce products. Mass production would assist in reducing the effective cost per unit or cost per unit area produced. Mass production capability allows for such efficiencies which previously have not been possible. The ability to mass produce large volumes or large areas enables commercialisation of products that have previously not been possible by traditional forming methods.

It is therefore an object of the present invention to provide an improved method for forming or to provide items formed by the method or via precursors formed by the improved method to provide formed features at a nano-scale or a near nano-scale addressing the foregoing problems or which will at least provide the industry or public with a useful choice.

In this specification where reference has been made to patent specifications, other external documents, or other sources of information, this is generally for the purpose of providing a context for discussing the features of the invention. Unless specifically stated otherwise, reference to such external documents is not to be construed as an admission that such documents, or such sources of information, in any jurisdiction, are prior art, or form part of the common general knowledge in the art.

Further aspects and advantages of the present invention will become apparent from the ensuing description which is given by way of example only.

SUMMARY OF THE INVENTION

In a first aspect, the invention broadly consists of a method for forming a polymer comprising: heating of a polymer to be formed to a temperature above its glass transition temperature, continuously flowing the polymer onto a moulding surface (herein after "lower moulding surface") of a first mould, the polymer remaining above the glass transition temperature, applying a moulding surface (herein after "upper moulding surface) of a second mould to at least the exposed surface (herein after "upper surface") of the polymer while the polymer remains at a temperature above the glass transition temperature, and allowing the polymer to transition to below the glass transition temperature while within or between the upper and lower moulding surfaces, wherein after the polymer is removed from the moulding surfaces.

In a second aspect, the invention broadly consists of a method for forming a polymer comprising: continuously flowing a polymer that is above its glass transition temperature, onto a moulding surface (herein after "lower moulding surface") of a first mould, applying a moulding surface (herein after "upper moulding surface) of a second mould to at least the exposed surface (herein after "upper surface") of the polymer while the polymer remains at a temperature above the glass transition temperature, and allowing the polymer to transition to below the glass transition temperature while within or between the upper and lower moulding surfaces, wherein after the polymer is removed from the moulding surfaces.

In a third aspect, the invention broadly consists of a method for forming two polymers comprising: heating each of a first polymer and a second polymer to temperatures above each polymer's respective glass transition temperature, continuously flowing the first of the polymers onto a moulding surface (herein after "lower moulding surface") of a first mould, the first polymer remaining above its glass transition temperature, continuously flowing the second of the polymers onto the exposed surface (herein after "upper surface") of the first polymer, the second polymer remaining above its glass transition temperature, applying a moulding surface (herein after "upper moulding surface") of a second mould to at least the upper surface of the second polymer while each of the polymers remain at a temperature above their respective glass transition temperatures, and allowing the polymers to transition to below their respective glass transition temperatures while held within or between the moulding surfaces, wherein after the polymers, bonded together, are removed from the upper and lower moulding surfaces.

In a fourth aspect, the invention broadly consists of a method for forming a plurality of polymers comprising: heating each of a plurality of polymers to a temperature above each polymer's respective glass transition temperature, continuously flowing a first of the polymers onto a moulding surface (herein after "lower moulding surface") of a first mould, the first polymer remaining above the glass transition temperature, continuously flowing a second of the polymers onto the a exposed surface of the first polymer, the second polymer remaining above the glass transition temperature, continuously flowing one or more further polymers onto the exposed surface of each further respective polymer, each of the further polymers remaining above their respective glass transition temperature, applying an moulding surface (herein after "upper moulding surface) of a second mould to at least the upper surface of the upper-most polymer while each of the polymers remain at a temperature above their respective glass transition temperatures, and allowing the polymers to transition to below their respective glass transition temperatures while held within or between the moulding surfaces, wherein after the polymers so formed are removed from the moulding surfaces.

In a fifth aspect, the invention broadly consists of a method of continuously forming a polymer comprising: continuously advancing a polymer that is above its glass transition temperature through a forming zone where said polymer is subjected to (a) pressure, and (b) mould forming to impart a nano-scale sized surface texture (preferably nano-scale sized texture has at least one dimension in the range of 0.1-1000 nm) on to at least part of a surface of said polymer, and (c) active heat removal to transition said polymer to below the glass transition temperature, wherein after said forming zone the polymer is removed from the moulding surfaces.

In some embodiments, said forming zone is defined by a serially advancing moulding surface or surfaces (herein after "lower moulding surface") of a first mould or moulds and a moulding surface or surfaces (herein after "upper moulding surface) of a second mould or moulds. In some embodiments, the whole of the polymer(s) to be formed remain above their respective glass transition temperatures during at least the initial applying of a forming pressure onto said polymer(s) between the upper and lower moulding surfaces. In some embodiments, the moulding surface(s) are each respectively part of a mould part that is/are thermally conductive. In some embodiments, the lower moulding surface and preferably the upper moulding surface are temperature controllable for maintaining the polymer(s) to be formed above their respective glass transition temperatures at least prior to the step of applying the upper moulding surface. In some embodiments, the upper and lower moulding surfaces are temperature controllable for controllably allowing the polymer(s) so formed to reduce to below their respective glass transition temperatures prior to removing of the polymer(s) so formed from the moulding surfaces.

In some embodiments, the first mould is mounted to a first or lower platen. In some embodiments, the second mould is mounted to a second or upper platen. In some embodiments, at least one of the moulding surfaces defines one or more nano or near-nano or micron or near micron sized surface reliefs or profile. In some embodiments, at least one of the moulding surfaces defines a nano or near-nano or micron or near micron sized surface pattern. In some embodiments, applying the upper moulding surface comprises bringing the upper moulding surface into contact with at least the uppermost surface of the upper polymer. In some embodiments, the polymer(s) assume the shape of the lower mould surface and upper mould surface when above its polymers glass transition temperature. In some embodiments, the polymer(s) is/are heated to above the glass transition temperature and is/are fed via extrusion to an extrusion head for flowing directly onto the lower moulding surface. In some embodiments, a melt pump controls the flow rate of polymer.

In some embodiments, the polymer(s) when above the glass transition temperature is/are in the liquid phase. In some embodiments, the moulding surfaces are at temperature(s) just above the glass transition temperature of the polymer(s) to be formed when the polymers are initially located between the upper and lower moulding surface. In some embodiments, the moulding surfaces are maintained at temperatures above the glass transition temperature of the polymer(s) during the step of applying an upper moulding surface to at least the upper surface of the polymer or upper-most polymer. In some embodiments, at least one of the moulding surfaces comprise surface reliefs and applying the upper moulding surface, applies pressure to the polymer(s) for moving the polymer(s) into the moulding surface(s)'s surface reliefs. In some embodiments, the upper moulding surface and lower moulding surface apply a moulding pressure to said polymer of up to about 500 $kg/cm^2$. In some embodiments, the upper moulding surface and lower moulding surface apply a moulding pressure to said polymer of up to about 260 $kg/cm^2$. In some embodiments, the upper moulding surface and lower moulding surface apply a moulding pressure to said polymer of up to about 60 $kg/cm^2$. In some embodiments, the upper moulding surface and lower moulding surface apply a moulding pressure to said polymer in the range of about 1-200 $kg/cm^2$, 1-150, 1-100, 1-90, 1-80, 1-70, 1-60, 1-50, 1-40, 1-30, 1-20, 1-10, 1-9, 1-8, 1-7, 1-6, 1-5, 1-4, 1-3, 1-2, 1-1.5, 1-1.2 $kg/cm^2$. In some embodiments, the upper moulding surface and lower moulding surface apply a moulding pressure to said polymer of less than about 1 $kg/cm^2$. In some embodiments, the upper moulding surface and lower moulding surface apply a moulding pressure to said polymer of about 0.9, 0.8, 0.7, 0.6, 0.5, 0.4, 0.3, 0.2, 0.1 $kg/cm^2$.

In some embodiments, the polymer is a thermosetting or thermoplastic polymer. In some embodiments, the polymer is selected from one of: polycarbonate (PC), polystyrene (PS), general purpose polystyrene (GPPS), polymethyl methacrylate (PMMA), thermoplastic (poly) urethane (TPU), polyethylene terephthalate (PET), polyester methacrylate (PEM), Polypropylene (PP), High impact polystyrene (HIPS), Acrylonitrile butadiene styrene (ABS), Polyester (PES), Polyamides (PA), Poly(vinyl chloride) (PVC), Polyurethanes (PU), Polyvinylidene chloride (PVDC), Polyethylene (PE), Polytetrafluoroethylene (PTFE), Polyetheretherketone (PEEK) (Polyetherketone), Polyetherimide (PEI) (Ultem), Polylactic acid (PLA), high impact polystyrene, aquilobutalstyrene, nylons, acrylics, amorphous polymers, polyethylene (PE), polyethylene terephthalate (PET), low density polyethylene (LDPE), low density polyethylene (LLDPE), thermoplastic ethylene (TPE), polypropylene (PP), rubbers, phenolics and the like.

In some embodiments, the upper surface is applied to the polymer(s) to apply pressure to said polymer(s) by virtue of movement of the polymer between said two moulding surfaces. In some embodiments, said lower moulding surface is supported by a conveyor. In some embodiments, said upper moulding surface is supported by a conveyor. In some embodiments, said lower moulding surface is supported and moved by a first conveyor and said upper moulding surface is supported and moved by a second conveyor that is located adjacent said first conveyor in order to position the second moulding surface adjacent said first moulding surface and move said first and second moulding surfaces through a pressure zone at where the polymer is subjected to pressure between said first and second moulding surfaces. In some embodiments, said polymer is above its glass transition temperature upon entering said pressure zone. In some embodiments, the temperature of at least one of said first and second moulding surfaces is actively controlled in said pressure zone. In some embodiments, the temperature of the lower moulding surface is actively controlled prior to the pressure zone. In some embodiments, the temperature of the lower moulding surface is sufficiently high to help keep the polymer deposited thereon, and prior to said polymer entering said pressure zone, above its glass transition temperature. In some embodiments, actively controlled heat removal occurs from said polymer via at least one of said upper and lower moulding surfaces, when said polymer is in said pressure zone, to transition said polymer from above its glass transition temperature to below its glass transition temperature within said pressure zone, at least by the virtue of the control of temperature of at least one of the first and second moulding surfaces.

In a further aspect, the invention broadly consists of a method of continuously forming a polymer comprising: laying a sheet of a polymer that is below its glass transition temperature onto a moulding surface (herein after "lower moulding surface") of a first mould, transitioning the polymer to above its glass transition temperature, advancing said polymer into a pressure zone whilst supported by said lower moulding surface and whilst remaining above its glass transition temperature, said pressure zone defined by said lower moulding surface and a moulding surface (herein after "upper moulding surface) of a second mould positioned relative said upper moulding surface to contact at least the exposed surface (herein after "upper surface") of the polymer while the polymer remains at a temperature above the glass transition temperature and to apply pressure to said polymer between said upper and lower moulding surfaces, and controlling the removal of heat from said polymer whilst in said pressure zone to transition said polymer to below the glass transition temperature, wherein after the polymer is removed from the moulding surfaces.

In some embodiments, the method is for mass production formed polymer. In some embodiments, claims wherein the method is for continuously forming a polymer. In some embodiments, the method is used to form nano-scale sized texture (preferably the nano-scale texture has at least one dimension in the range of 0.1 to 1000 nm) onto at least one of the surfaces of said polymer. In some embodiments, at least one of the upper and lower moulding surfaces includes as nano-scale sized surface texture (preferably the nano-scale texture has at least one dimension in the range of 0.1 to 1000 nm) that is to impart a substantially corresponding nano-scale sized surface texture (preferably the nano-scale texture has at least one dimension in the range of 0.1 to 1000 nm) onto said polymer formed by said method.

In a further aspect, the invention broadly consists of a polymer film or sheet that is formed by the method as claimed in anyone or more of the preceding claims.

In a further aspect, the invention broadly consists of a polymer film or sheet as defined above that includes a nano scale sized surface texture (preferably the nano-scale texture has at least one dimension in the range of 0.1 to 1000 nm) on at least one of its surfaces.

In a further aspect, the invention broadly consists of a non-reflective product formed according to the process as defined in the above aspects.

In a further aspect, the invention broadly consists of an apparatus for continuously forming a polymer (preferably to define a nano-scale sized surface texture onto at least part of the surface of said polymer so formed) comprising: an extruder, including an extruder head, for continuously extruding (preferably liquid) polymer extrudate, a forming zone to receive said extrudate above its glass transition temperature, said forming zone defined by a serially advancing moulding surface or surfaces (herein after "first moulding surface") of a first mould or moulds and a serially advancing moulding surface or surfaces (herein after "second moulding surface) of a second mould or moulds, said first moulding surface(s) preferably presented to receive (preferably by laying down onto it) said polymer extrudate prior to it advancing into said forming zone and to carry said polymer extrudate into said forming zone, said forming zone configured to subject said polymer extrudate to (a) pressure, and (b) mould forming (to preferably impart a nano-scale sized surface texture onto at least part of a surface of said polymer), and (c) active heat removal to transition said polymer to below the glass transition temperature.

In some embodiments, said active heat removal occurs via at least one of said first and second moulding surfaces by at least one temperature controlled heat sink. In some embodiments, a plurality of heat sinks are provided for at least one of said first and second moulding surfaces, said heat sinks spaced relative to each other in a forming zone advanced and retarded more orientation. In some embodiments, a said heat sink advanced more is of a temperature lower than an adjacent retarded more heat sink, in order to progressively reduce the temperature of said polymer as it advances through said forming zone. In some embodiments, a temperature controller is provided for each said heat sink to control the temperature of each heat sink. In some embodiments, at least one of said first and second moulding surfaces can transfer heat to said polymer at least at the beginning of said forming zone, by virtue of a heater. In some embodiments, said first moulding surface is presented to receive said polymer prior to said polymer entering said forming zone. In some embodiments, a heater is provided to heat said first moulding surface prior to said first moulding surface entering said forming zone. In some embodiments, at least one heater is provided to heat at least one of said first and second moulding surfaces prior their entering said forming zone. In some embodiments, said heater(s) can facilitate the keeping of the polymer above its glass transition temperature at least the beginning of the forming zone. In some embodiments, said heater(s) can facilitate the keeping of the polymer above its glass transition temperature at least just prior to the polymer entering the forming zone.

In some embodiments, at least one of said first and second moulding surfaces include a nano-sized surface texture that can form a substantially corresponding nano-sized surface texture of said polymer. In some embodiments, said there are a plurality of discreet and/or sequentially advanced first and second moulding surfaces provided for advancement through said forming zone, each advancing through said forming zone in a paired relationship at a synchronised speed. In some embodiments, a finite or discreet number of first and second moulding surfaces are provided that repeatedly pass through said forming zone. In some embodiments, a finite or discreet number of first and second moulding surfaces are provided that pass through said forming zone only once. In some embodiments, at least one of said first and second forming surface is/are each of a continuous in form.

In a further aspect, the invention broadly consists of an apparatus for continuously forming a polymer (preferably to define a nano-scale sized surface texture onto at least part of the surface of said polymer so formed) comprising: a forming zone to receive a polymer at a temperature where the polymer is above its glass transition temperature, said forming zone defined by a serially advancing moulding surface or surfaces (herein after "lower moulding surface") of a first mould or moulds and a serially advancing moulding surface or surfaces (herein after "upper moulding surface) of a second mould or moulds, said lower moulding surface(s) preferably presented to receive said polymer prior to it advancing into said forming zone and to carry said polymer into said forming zone, said forming zone configured to subject said polymer to (a) pressure, and (b) mould forming (to preferably impart a nano-scale sized surface texture onto at least part of a surface of said polymer), and (c) active heat removal to transition said polymer to below the glass transition temperature.

In a further aspect, the invention broadly consists of an apparatus for continuously forming a co-extruded material (preferably to define a nano-scale sized surface texture onto at least part of the surface of said material so formed) comprising: at least one extruder for forming an extrudate of at least two polymers in a-co-extruded form, a forming zone to receive said extrudate in a condition where at least one and preferably both/all polymers are above their respective glass transition temperature, said forming zone defined by a serially advancing moulding surface or surfaces (herein after "first moulding surface") of a first mould or moulds and a serially advancing moulding surface or surfaces (herein after "second moulding surface) of a second mould or moulds, said first moulding surface(s) preferably presented to receive (preferably by laying down onto it) said extrudate prior to it advancing into said forming zone and to carry said extrudate into said forming zone, said forming zone configured to subject said polymer extrudate to (a) pressure, and (b) mould forming (to preferably impart a nano-scale sized surface texture onto at least part of a surface of said extrudate), and (c) active heat removal to transition said extrudate to below the glass transition temperature. In some embodiments, said extruder is provided for each of said polymers.

In a further aspect, the invention broadly consists of a polymer with a nano-sized surface texture formed by the above apparatus.

In a further aspect, the invention broadly consists of a continuously formed polymer with a nano-sized surface texture.

In a further aspect, the invention broadly consists of a continuously formed coextruded material comprising at least two polymers wherein at least one polymer includes a nano-sized surface texture.

In a further aspect, the invention broadly consists of continuously forming a polymer with a nano-sized surface texture.

In a further aspect, the invention broadly consists of continuously forming a coextruded material comprising of at least two polymers, wherein at least one of said polymers includes a nano-sized surface texture.

In a further aspect, the invention broadly consists of a sheet or film of at least one polymer (and preferably at least two co-extruded polymers) that includes a nano-sized surface texture that has been formed by continuous or non-discrete or non-finite processing of at least one precursor polymer material.

In a further aspect, the invention broadly consists of a single sheet or film of at least one polymer (and preferably at least two co-extruded polymers) that includes plurality of identical and repeated zones of nano-sized surface texture that has been formed by a continuous or non-discrete or non-finite process.

In a further aspect, the invention broadly consists of a plurality of discreet sheets or film of at least one polymer (and preferably at least two co-extruded polymers) that each include identical nano-sized surface texture that has been separated from a single sheet or film precursor formed in a continuous or non-discrete or non-finite manner.

In some embodiments, the lower moulding surface is mounted to a first or lower platen. In some embodiments, the upper moulding surface is mounted to a second or upper platen. In some embodiments, the moulding surface is comprised of one or more nano or near-nano or micron or near-micron sized surface reliefs or profile. In some embodiments, applying the upper moulding surface comprises bringing the upper moulding surface into contact with at least the upper-most surface of the upper polymer. In some embodiments, the polymer(s) assume the shape of the lower mould and upper mould when above each polymers glass transition temperature. In some embodiments, the polymer(s) heated to above the glass transition temperature is fed via extrusion to an extrusion head for flowing into the lower moulding surface. More preferably, a melt pump controls the flow rate of polymer to the extrusion head. In some embodiments, the polymer(s) is in the liquid phase.

In some embodiments, the moulding surfaces are provided at temperatures substantially at or near or above the glass transition temperature of the polymer(s) to be formed. In some embodiments, the moulding surfaces are maintained at temperatures substantially at or near or above the glass transition temperature of the polymer(s) during the step of applying an upper moulding surface to at least the upper surface of the upper-most polymer. In some embodiments, the moulding surfaces are controllable to be at temperatures at least above the glass transition temperature of the polymer(s) to be formed.

In some embodiments, the moulding (die) surface(s) are thermally conductive. In some embodiments, the moulding (die) surface(s) having relatively higher thermal conductivity than other moulding (die) surfaces may be used. In some embodiments, the moulding surface is one or more of: nickel, steel, aluminum, carbon. In some embodiments, the moulding (die) surface(s) are three-dimensional moulding surfaces (i.e. not planar).

In some embodiments, a near net shaped is formed on flowing of the polymer material to the lower moulding surface. In some embodiments, a net shape is formed on applying of the upper moulding surface to at least the upper surface of the upper-most polymer.

In some embodiments, applying the upper moulding surface applies pressure to the polymer(s) for moving the polymer(s) into the die surface. In some embodiments, applying the upper moulding surface assists in removing of air from the moulding surface, allowing the polymer(s) to flow into the moulding surface(s). In some embodiments, pressure is applied while the materials or polymer(s) to be formed remain above their glass transition temperatures.

In some embodiments, the upper moulding surface applies a moulding pressure of up to about 500 $kg/cm^2$, optionally up to about 260 $kg/cm^2$, optionally up to about 60 $kg/cm^2$, optionally the pressure is in the range of about 1-200 $kg/cm^2$, 1-150, 1-100, 1-90, 1-80, 1-70, 1-60, 1-50, 1-40, 1-30, 1-20, 1-10, 1-9, 1-8, 1-7, 1-6, 1-5, 1-4, 1-3, 1-2, 1-1.5, 1-1.2 $kg/cm^2$. Alternatively, the pressure applied may be less than about 1 $kg/cm^2$, optionally about 0.9, 0.8, 0.7, 0.6, 0.5, 0.4, 0.3, 0.2, 0.1 $kg/cm^2$.

In some embodiments, cooling and/or skinning of the polymer(s) are allowed to begin occurring after the polymer(s) has taken the shape of the moulding surface(s). For example, cooling and/or skinning are allowed to begin occurring after the step of applying the upper moulding surface and the upper moulding surface has exerted a moulding pressure.

In a further aspect, the present invention broadly consists in a method of forming an item in a manner to include a surface or surfaces with surface detail at a nano or near nano-scale, said method comprising: applying by flowing or laying or depositing a formable material onto a surface, and forming the material.

In another aspect, the present invention broadly consists in a method of forming an item with at least one surface that includes nano-sized surface relief, said method comprising: introducing onto a surface of a first platen a layer or layers of precursor material(s) to be formed, said material being in a molten or optionally a near molten or at least a non-rigid state when introduced, applying a pressure onto the layer(s) by way of a second platen that is displaced towards said first platen, to at least in part form the precursor material, wherein one or both platen carry or have a surface that includes nano-sized surface relief to form the material with, at least in part, a negative thereof.

In some embodiments, the method comprises applying the material when the material is in a relaxed or a reduced stress condition. In some embodiments, the material may be a flowable material. Even more preferably the material may be at or near a substantially molten or semi-molten state. Most preferably, the material may be in its liquid phase. In some embodiments, applying the material to the surface may be by flowing the material. In some embodiments, the material may be applied to the surface to a depth of less than about 50, 40, 30, 20, 10 mm, more preferably less than about 5 mm, even more preferably less than about 3 mm, most preferably less than about 2 mm. In some embodiments, the material may be applied to the surface to a depth of about 0.1 mm to about 3 mm. Alternatively, the depth is about 4, or 3, or 2 or 1 mm.

Alternatively, the depth of material applied to the surface may be to a depth of at least about 0.5, 1, 2, 3, 4, 5, 6, 7, 8, 9, 10, 15, 20, 25, 30, 35 40, 45, 50 or 55 micrometers or about 56, 60, 65, 70, 75, 80, 85, 90, 95, 100, 105, 110, 115, 120, 125, 130, 135, 140, 145, 150, 155, 160, 165, 170, 175, 180, 185, 190, 195, 200, 220, 240, 260, 280, 290, 300, 350, 400, 450, 500, 550, 600, 650, 700, 750, 800, 850, 900, 950, 1000, 1050, 1100, 1150, 1200, 1250, 1300, 1350, 1400, 1450, 1500, 1550, 1600, 1650, 1700, 1750, 1800, 1850, 1900, 1950, 2000, 2050, 2100, 2150, 2200, 2250, 2300, 2350, 2400, 2450, 2500, 2550, 2600, 2650, 2700, 2750, 2800, 2850, 2900, 2950, 3000, 3500, 3550, 3600, 3650, 3700, 3750, 3800, 3850, 3900, 4000, 4050, 4100, 4150, 4200, 4250, 4300, 4350, 4400, 4450, 4500, 4550, 4600, 4650, 4700, 4750, 4800, 4850, 4900, 4950, 5000 micrometers or 0.1 millimeters to about 3 millimeters and useful ranges may be selected between any of these values (for example, about 0.5 millimeters to about 3 millimeters, about 0.2 millimeters to about 2 millimeters).

In some embodiments, the material may be applied to the surface to a depth such that reheating of the imprinted surface of the material or product once removed from the die is minimised. In some embodiments, the thinner the depth of material applied to the surface the faster the forming (compression or imprinting) process needs to be to take place and the item or product thus formed will have a shorter cooling time.

In some embodiments, the material for forming is applied to a substrate which is then placed on the surface or platen for forming. The substrate may be any depth. The depth of material applied may also be to any depth, the method of forming imprinting a nano-scale impression or pattern onto the material. In some embodiments, where the material is polystyrene its temperature may be controlled to be about 230° C. on contact with the surface. In some embodiments, where the material is polycarbonate its temperature may be controlled to be about 300° C. on contact with the surface.

In some embodiments, the material may be temperature controlled according to predetermined material rheological characteristics. For example, such as reaching a molten or a semi-molten state or a liquid phase that allows for flowing of the material to the surface. In some embodiments, the material may be temperature controlled and allowed to pool before applying the pooled material to the surface by flowing. In an alternative, the material may be provided to the surface in substantially a sheet formation. For example, the material can be an extrudate (i.e. continuous body of flow) from an extrusion system, optionally including a melt pump.

In some embodiments, the material may be one or more of: a material able to be heated to above its glass transition temperature and continuously flowed in a controlled manner on to a moulding surface (the material being in the liquid phase), a molten mouldable material, a thermoformable material applied at a thermo-formable temperature, a thermoformable material to be heated by the surface or a forming tool or tools to a formable condition, a thermoformable material or molten mouldable material to be cooled by the surface or a forming tool or tools or otherwise, a thermoformable material to be thermoset by the surface or a forming tool or tools, and any of the foregoing together with one or more material of a different character. In one embodiment, material can be flowed onto the die surface at near molten state, heated while on the die surface to raise the material above its glass transition temperature thereby allowing the material to assume the shape of the mould when in its liquid phase.

In some embodiments, the material may be selected from a thermosetting polymer or a thermoplastic polymer. In some embodiments, the material may be applied to the surface at a thermoformable temperature. In some embodiments, the material may be a polymeric composite. In some embodiments, the material may be a polycarbonate (PC) or a polystyrene (PS) or a general purpose polystyrene (GPPS) or a polymethyl methacrylate (PMMA), thermoplastic polyurethanes (TPU), polyethylene terephthalate (PET), polyester methacrylate (PEM), Polypropylene (PP), High impact polystyrene (HIPS), Acrylonitrile butadiene styrene (ABS), Polyester (PES), Polyamides (PA), Poly(vinyl chloride) (PVC), Polyurethanes (PU), Polyvinylidene chloride (PVDC), Polyethylene (PE), Polytetrafluoroethylene (PTFE), Polyetheretherketone (PEEK) (Polyetherketone), Polyetherimide (PEI) (Ultem), Polylactic acid (PLA).

Further example materials that may be used with the method of forming of the present invention are as follows. Various thermal formable materials may be used such as but not limited to polystyrene (PS), high impact polystyrene, polycarbonate (PC), aquilobutalstyrene (ABS), nylon, and all acrylics and not just those limited to crystalline polymers. Various thinner plastic materials may be used such as amorphous polymers but not limited to amorphous polymers and may be for example polyethylene (PE), polyethylene terephthalate (PET), low density polyethylene (LDPE), low low density polyethylene (LLDPE), thermo-plastic urethane (TPU), thermoplastic ethylene (TPE) and polypropylene (PP). For example there may be a polypropylene from 1 to 20 layers fed into the machine and with the appropriate dies in place there may, for example be of the form of, plates and bowls or similar dished or shaped materials formed. Further, thermoset materials may be used such as rubbers, phenolics and the like.

In some embodiments, the material may be an optical media, such as any one or more of the following: ultraviolet stabilised thermoplastic polyurethane (TPU), polycarbonate (PC), polymethyl methacrylate (PMMA), general purpose polystyrene (PS). Optical media may for example be materials suitable as optical lenses.

In some embodiments, there may be a number of varying materials able to be fed for flowing and use in the method of forming according to the present invention. For example, further suitable materials may comprise those able to be affected or acted upon by the pressure of a forming operation, for example in a forming zone. Such action may be catalysed, created, or formed by the action of pressure and or heat but the end result is that at least that one material of the materials for forming has a formed change imparted to it. In a further example, a ductile material such as a sheet metal may be feed in with various materials above and below it and the metallic material or malleable material is thus formed into the desired shape in the pressure forming zone and regardless whether the other materials are affected by the pressure forming zone provided that at least that one material, in this instance, may be at a molten or semi-molten condition, for example a semi-molten sheet metal.

The basic breakdown of materials that may be formed are those that will retain shape or take on a shape or imprint under pressure alone (for example malleable or ductile metals such as lead, copper, zinc or the like, plastics or the like) thermoplastic compounds that require heat to enable them to be formed, thermosetting compounds that require heat or some other form of catalyst in addition with pressure can be formed, or in general thermoformable compounds that require heat and pressure to allow formation thereof. As an example a rubber can be pressure formed but also with the addition of heat may facilitate further cross linking of the rubber molecules so that one the pressure and heat are removed the shape imparted to the rubber material is retained.

In other materials it may be the pressure which forms the material and the heat which sets the material off for example in thermosetting materials or two pot or more materials which require heat as a catalyst. For example a feed material of preimpregnated carbon fibre could be one such material the application of pressure forming the material and the application of heat setting the material off and curing the matrix or an epoxy.

Preferred materials are those capable of being heated such that the material or constituents of the material can be put into the liquid phase (i.e. above the material's glass transition temperature, $T_g$). On cooling (i.e. reducing to below the material's glass transition temperature, $T_g$), the material is allowed to solidify (crystallise) and thereby retain the shape or surface relief pattern of a mould into which the material was flowed when in the liquid phase. In some embodiments, the material may form a part of or be a conductive polymer. In some embodiments, the material may form a part of or be a polymer wound dressing.

In some embodiments, the product formed may be subjected to a metalizing treatment. More preferably, a formed product subjected to a metalizing treatment may have the formed material (polymer(s)) removed, for example by dissolution, the resulting metal structure having a negative detail of the formed product's surface. In some embodiments, the product so formed may be of an anti-reflective or strongly non-reflective surface relief structure. In some embodiments, the surface is presented to or forms a part of a forming zone. Preferably the forming zone is a pressure forming zone.

In some embodiments, the surface may form a part of a surface of a forming block. Preferably the surface may be one surface of a forming tool or a die or an imprinter. In some embodiments, the surface is one platen of a press or a forming tool. In some embodiments, the surface is a part of a continuous forming tool (CFT). In some embodiments, the surface is a part of a moving belt former (MBF). In some embodiments, forming may include imprinting. In some embodiments, the die may be an imprinter die.

In some embodiments, the forming tool or die or imprinting surface for forming the material comprises one or more metal coated nanotubes. In some embodiments, the metal coated nanotubes are arranged or configured according to a predetermined product to be formed. In some embodiments, the moulding surface is a nickel die surface. In some embodiments, surface is one platen of a press with an opposing platen of suitable topology for imprinting or pressing a desired pattern into the material. In some embodiments, the topology is a profile. In some embodiments, one or both of the platen include or carry a surface defining nano-scale surface detail to be formed onto the material. In some embodiments, the material may be temperature controlled before applying to the surface. In some embodiments, the material may be temperature controlled when applied to the surface. In some embodiments, the material may be temperature controlled before applying to the surface and temperature controlled when applied to the surface.

In yet another aspect, the present invention broadly consists in a method according to any one of the aspects above to form one or more of the following types of items: membranes for separation such as for separation of components from or within water, chemicals, gases, blood, or use within fuel cells, sensor devices, light diffusers, light emitters, wave reflecting or absorbing such as radar etc., electronic circuits or circuitry, particle alignment or aligning technologies, water repellents or water repelling technologies such as hydrophobic materials, optical media such as a liquid crystal display ("LCD") or a compact disc ("CD") or a digital video disc ("DVD") technology or a photo-voltaic cell, memory storage devices, medical devices such as for skin repair or wound repair (e.g. bandages), drug delivery mechanisms or devices, reduced (low) friction surface materials, increased (high) friction surface materials, lamination technology, radio frequency identification ("RFID") chips, conductive polymer layers/products/circuits, light bending technologies such as negative light reflections, anti-reflective surfaces or formed surface structures which are subsequently metallised and the formed product material removed therefrom.

In yet another aspect, the present invention broadly consists in one or more of the following items formed from a material precursor that is laid or applied onto one platen of a press to be formed in conjunction with at least one other platen pressed toward one another, wherein the items may be: membranes for separation such as for separation of components from or within water, chemicals, gases, blood, or use within fuel cells, sensor devices, light diffusers, light emitters, wave reflecting or absorbing such as radar etc., electronic circuits or circuitry, particle alignment or aligning technologies, water repellents or water repelling technologies such as hydrophobic materials, optical media such as a liquid crystal display ("LCD") or a compact disc ("CD") or a digital video disc ("DVD") technology or a photo-voltaic cell, memory storage devices, medical devices such as for skin repair (e.g. bandages), drug delivery mechanisms or devices, reduced (low) friction surface materials, increased (high) friction surface materials, lamination technology, radio frequency identification ("RFID") chips, conductive polymer layers/products/circuits, light bending technologies such as negative light reflections, anti-reflective surfaces or formed surface structures which are subsequently metallised and the formed product material removed therefrom.

In some embodiments, the item formed may be an optical media includes one or more of a photovoltaic cell, a compact disc (CD), a digital video disc (DVD). In some embodiments, the item formed may be an optical media includes a liquid crystal display ("LCD"). In some embodiments, the item formed may be an element of a conductive circuit. In some embodiments, one or both of the platen include or carry a surface defining micron-scale or nano-scale surface detail to be formed onto the material precursor.

Incorporated by reference herein is PCT/NZ2006/000301 that describes an improved method of forming to which the present invention may have application. Also incorporated by reference herein is PCT/NZ2006/000300 that describes an improved forming apparatus to which the present invention may have application.

DEFINITIONS

"Nanoscale" or "nano" as used herein has the following meaning—having one or more dimensions in the range of 0.1 to 1000 nanometers.

"Liquid phase" is a phase of the material other than solid or gaseous. That is, a phase of the material being a liquid. Liquid phase is one of the three basic structural states of matter in which the thermal mobility of molecules or atoms is comparable with the cohesiveness, having them connected but fluid in a mass.

"Molten" as used herein has the following meaning—having material physical properties whereby increased internal energy of the material, typically by the application of heat, for example to a minimum specific temperature such as the melting point, changes the physical properties or state of the material from a solid to the liquid phase.

"Semi-molten" as used herein has the following meaning—a material having physical properties or state between that of a solid phase and those of a "molten" state or a "liquid phase".

The term "comprising" as used in this specification means "consisting at least in part of". When interpreting each statement in this specification that includes the term "comprising", features other than that or those prefaced by the term may also be present. Related terms such as "comprise" and "comprises" are to be interpreted in the same manner.

This invention may also be said broadly to consist in the parts, elements and features referred to or indicated in the specification of the application, individually or collectively, and any or all combinations of any two or more said parts, elements or features, and where specific integers are mentioned herein which have known equivalents in the art to which this invention relates, such known equivalents are deemed to be incorporated herein as if individually set forth.

The invention consists in the foregoing and also envisages constructions of which the following gives examples only.

BRIEF DESCRIPTION OF THE DRAWINGS

With reference to the accompanying drawings preferred embodiments of the present invention are now described, whereby.

DETAILED DESCRIPTION

Figure 1:
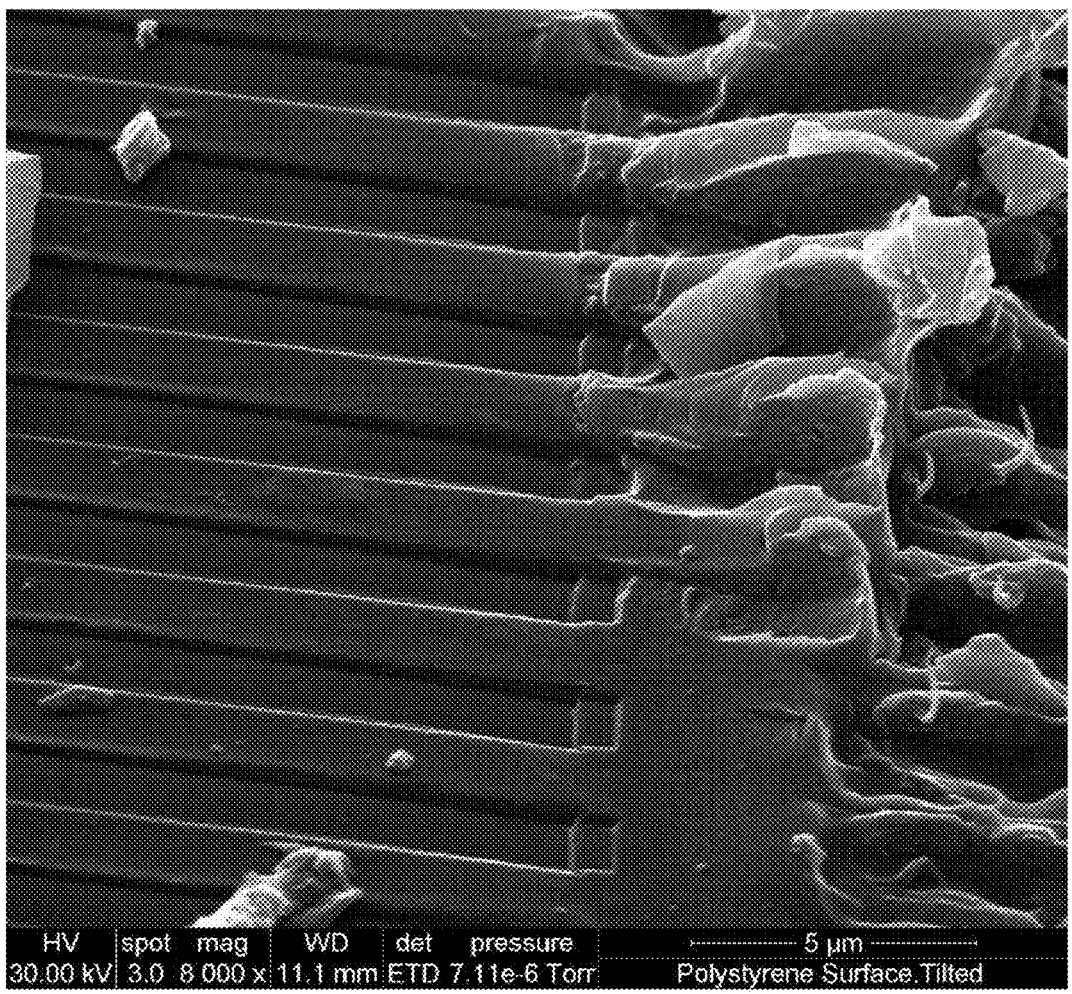
FIG. 1 is a nano-size scanning electron microscope image illustrating polymer flow when in a liquid state formed according to the present invention.

Preferred embodiments of the present invention will now be described with reference to the figures.

This invention recognises significant advantages in providing a method of forming a formable material when the material is provided in a flowable form or condition or state for a forming operation. Product processing line speeds can be greatly increased without loss of formed product quality. Further, this invention contemplates the forming of products of high quality reproducibility and high definition.

It is anticipated a limiting factor for maximum processing speed of this invention is the ability to, with some degree of accuracy, control the rate of feed and flow of material to be formed to the moulding surface. It will be appreciated that the improvement in flow rate control of extrudate will further enable greater processing speeds in due course.

In a first embodiment of the invention there is provided a method for forming a polymer comprising heating of a polymer to be formed to a temperature above the glass transition temperature ($T_g$), continuously flowing the polymer P(a) onto a lower moulding surface 2, the polymer P(a) remaining above the glass transition temperature, applying an upper moulding surface 3 to at least the upper surface 3a of the polymer P(a) while the polymer P(a) remains at a temperature above the glass transition temperature, and allowing the polymer P(a) to reduce to below the glass transition temperature while held within or between the moulding surfaces 2, 3. The polymer P(a) so formed in this manner is then removed from the moulding surfaces 2, 3.

In a second embodiment of the invention there is provided a method for forming two polymers comprising heating each of a first polymer P(a) and a second polymer P(b) to a temperature above each polymer's respective glass transition temperature ($T_g$), continuously flowing the first of the polymers P(a) onto a lower moulding surface 2, the first polymer P(a) remaining above the glass transition temperature, continuously flowing the second of the polymers P(b) onto the upper surface 3$a$ of the first polymer P(a), the second polymer P(b) remaining above the glass transition temperature, applying an upper moulding surface 3 to at least the upper surface 3$b$ of the second polymer while each of the polymers P(a), P(b) remain at temperatures above their respective glass transition temperatures, and allowing the polymers P(a), P(b) to reduce to below their respective glass transition temperatures while held within or between the moulding surfaces 2, 3. The polymers P(a), P(b) so formed in this manner are then removed from the moulding surfaces.

In a third embodiment of the invention there is provided a method for forming a plurality of polymers comprising heating each of a plurality of polymers to a temperature above each polymer's respective glass transition temperature, continuously flowing a first of the polymers P(a) onto a lower moulding surface 2, the first polymer P(b) remaining above the glass transition temperature ($T_g$), continuously flowing a second of the polymers P(b) onto the upper surface 3$a$ of the first polymer P(a), the second polymer P(b) remaining above the glass transition temperature, continuously flowing one or more further polymers onto the upper surface 3$x$ (not shown) of each further respective polymer P(x) (not shown), each of the further polymers remaining above their respective glass transition temperature, applying an upper moulding surface 3 to at least the upper surface 3$x$ of the upper-most polymer P(x) while each of the polymers remain at a temperature above their respective glass transition temperatures, and allowing the polymers to reduce to below their respective glass transition temperatures while held within or between the moulding surfaces 2, 3. In his manner the polymers P(a), P(b), P(x) so formed are removed from the moulding surfaces 2, 3.

Advantageously, the pressure applied from the upper moulding surface is applied while the materials or polymer(s) to be formed remain above their glass transition temperatures.

Cooling and/or skinning of the polymer(s) is allowed to begin occurring after the polymer(s) has taken the shape of the moulding surface(s) 2, 3. For example, cooling and/or skinning are allowed to begin occurring after the step of applying the upper moulding surface and the upper moulding surface has exerted a moulding pressure.

FIGS. 7-12 generally illustrate the continuous flow of polymer P(a), P(b) ((P(x) not shown) from an extrusion head 6 onto a lower moulding surface 2 of a continuous forming tool (CFT) or moving belt former (MBF) or other endless belt system 1. For ease of illustration, the upper moulding surface 3 is not shown in contact with the upper-most surface of the polymers P(a), P(b), P(x). However, it will be appreciated the upper moulding surface 3 can be controlled in height or gauging above the lower moulding surface 2 and lowered to a position such that the upper moulding surface 3 is applied to at least the upper-most surface of the polymers being moulded. Alternatively, the lower moulding surface may be brought towards the upper moulding surface. Adjustment of the distance between the upper and lower moulding surfaces may be adjusted during the forming process.

The extrusion head 6 can be that as used with any extrusion system which is capable of controlling the flow of material (polymer) to be moulded to the lower moulding surface 2. In addition to an extruder, a melt pump (not shown) may optionally be used in-line with the extruder to assist or improve accuracy and control of flow of extrudate to the moulding surface 2. A melt pump may be a particularly useful addition for increasing extruder output of polymer and controlling polymer extrudate flow rate.

With reference to the figures, an embodiment of the present invention shall now be discussed. As shown by the FIG. 6, temperature profile of a material is to be varied during the processing of the material according to the invention. The temperature of a material to be processed is indicated by $T_p$. For ease of reference, the process has also been divided into segments, although it will be appreciated that improved control systems and sensing during the process may allow for the process to be divided into a greater number of controllable segments. The segments shown are for general illustration. The process of the invention shall now be described in further detail.

Materials to be processed for forming are chosen. That material or materials are elevated to a temperature above each material's glass transition temperature ($T_g$). This initial heating stage is referred to as first temperature zone 1 (TZ-1). This step allows for putting the material(s) to be formed into a "flowable" state. Such a state is needed to allow the material to be controllably flowed onto a lower surface mould 2 on a CFT or MBF or endless belt system 1—the second temperature zone (TZ-2). It should be appreciated other forms of providing a moulding surface for continuous flowing of a material to be formed is possible.

During the second temperature zone (TZ-2) the material or environment in which the material is present (i.e. surrounding air or die or moulding surface(s)) is controlled to allow the material(s) to remain above their $T_g$, for example a heater or heaters may be used. The upper die or moulding surface 3 is then applied to the material(s) to be formed. In this manner, at least the surfaces of the material in contact with the die or moulding surface may be formed. Where for example two layers of material are flowed onto the moulding surface 2 (or more layers if desired) the moulding surface's relief pattern may extend substantially into some or all of the materials. In this manner, a multi-layer product can be formed. In one such embodiment, traditionally incompatible materials may be formed together, such as TPU and PC.

The material(s) are then held within the bounds of the moulding surfaces 2, 3 as the product being formed is conveyed along the endless belt system 1. Temperature zone 3 (TZ-3) controls the material(s) within the moulding surfaces 2, 3 for a further period of time and allows the material(s) to begin reducing in temperature from the temperature at which the material(s) was flowed onto the moulding surfaces.

After a further period of time, the material(s) have reduced in temperature further, and for example may be within the region of temperature zone four (TZ-4). TZ-4 allows the material(s) to reduce even further in temperature with the glass transition temperatures of the material being reached at the end of this zone.

Further temperature zones five, six and seven (TZ-5, TZ-6, TZ-7) are provided further downstream from TZ-1-TZ-4. These latter zones allow the material(s) to reduce in temperature from below the glass transition temperature towards an ambient temperature ($T_a$) (for example, down from about 90° C. to about 20° C.). These temperature zones are, like the earlier zones, temperature controlled to allow the material(s) that have been formed to cool while held within the die or moulding surfaces. The formed product this reduced to below the glass transition temperature of the material(s) and to near ambient temperatures ($T_a$) for removal from the moulding surface.

The length of time the material(s) need to be held within each temperature zone will depend on the linear line speed (LS-1) that the conveyor system 1 is operating at (e.g. meters/min). The length of time will also depend on the ability to control the rate of cooling of the material(s). The period of time within which the material(s) is held in each temperature zones can be controlled via adjusting the line speed LS-1 of the conveyor or length (i.e. lengthen or shorten) the cooling zones CZ. These periods will also be dependent on the cooling rates of the polymers being formed.

Generally, it is considered the heating zones (TZ-1, TZ-2) will be operated as fast as possible—this minimises the period of time energy is required to keep the material(s) above their $T_g$. Operating these temperature zone segments quickly will help minimise total (energy) heating requirements for the process and for delivering the material or polymer(s) at their most molten state.

Generally, it is considered the cooling zones (TZ-3, TZ4, TZ-5, TZ-6, TZ-7) will be operated according to the time needed for cooling of the material(s) to below their glass transition temperatures and further to ambient temperature $T_a$. Sufficient heat energy must be removed from the material(s) that have been formed such that on removal of the material from the die the material holds the formed shape. Removal from the die or moulding surface before sufficient heat energy has been removed from the material may result in heat energy from within the material continuing to transfer to the external surfaces of the material and product thus formed.

If the product formed is not cooled enough, the core of the product may retain enough heat energy to transmit to the surface of the formed product, resulting in destabilisation of the surface structure and product itself. In such a case the structural stability of the product thus formed may be lost as the material has not yet lost sufficient heat energy to set into a solid phase. As different materials (polymers) may cool at different rates, the CZ may be adjusted accordingly.

Figure 6:
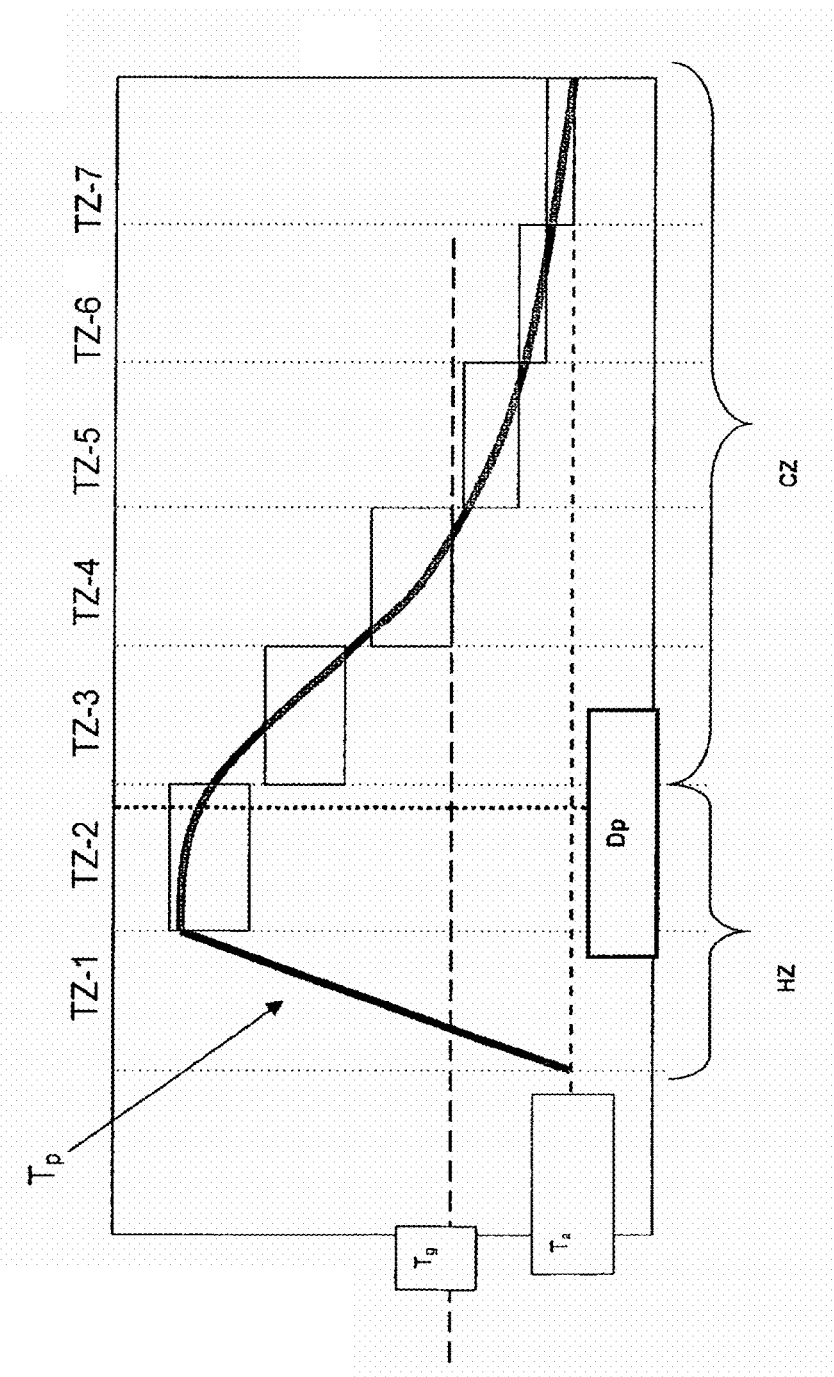
FIG. 6 is a graphical representation of temperature of the material to be formed across stages of the forming process according to the present invention.
Figure 7:
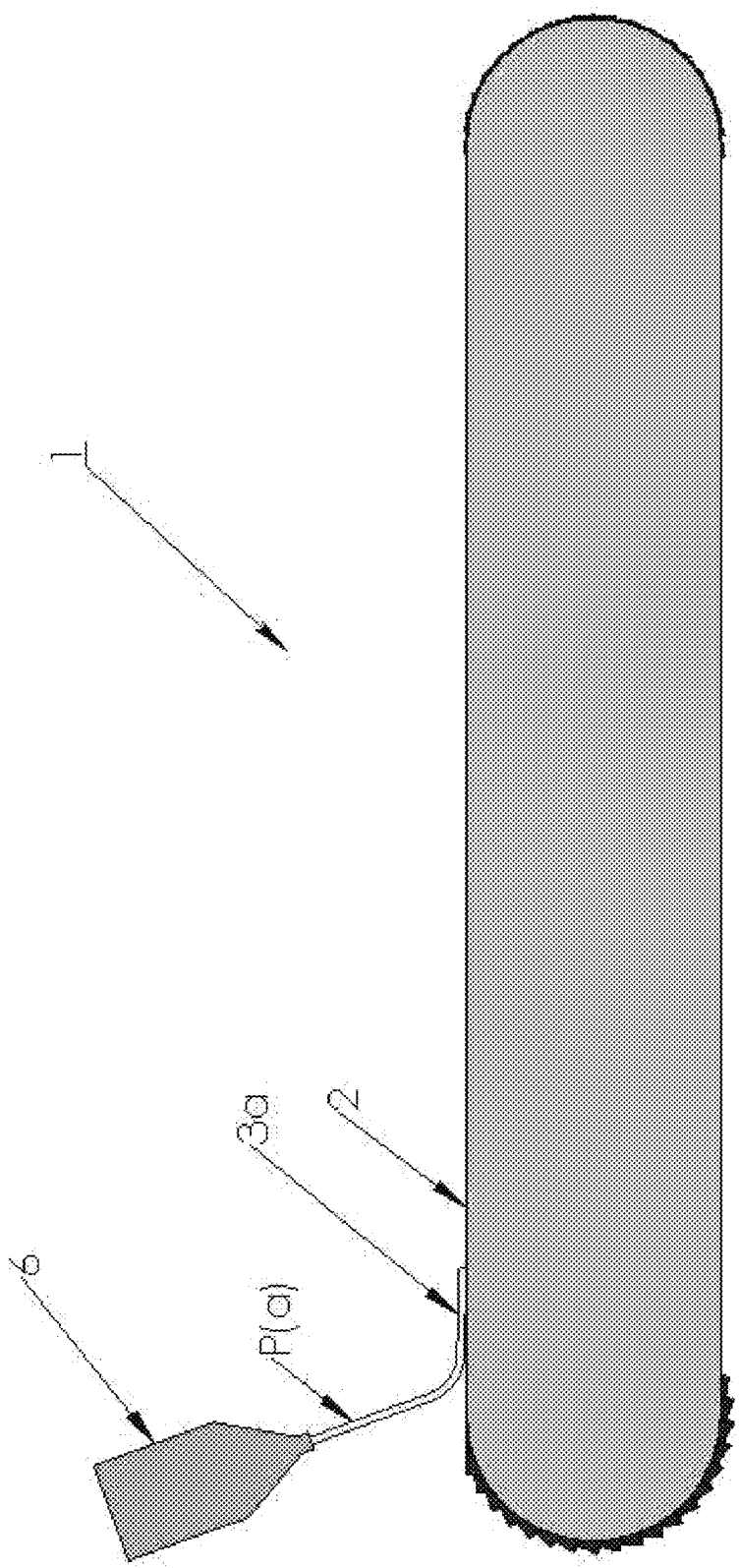
FIG. 7 is a side view of an extrusion head with a single extrudate flowing onto a lower moulding surface.
Figure 8:
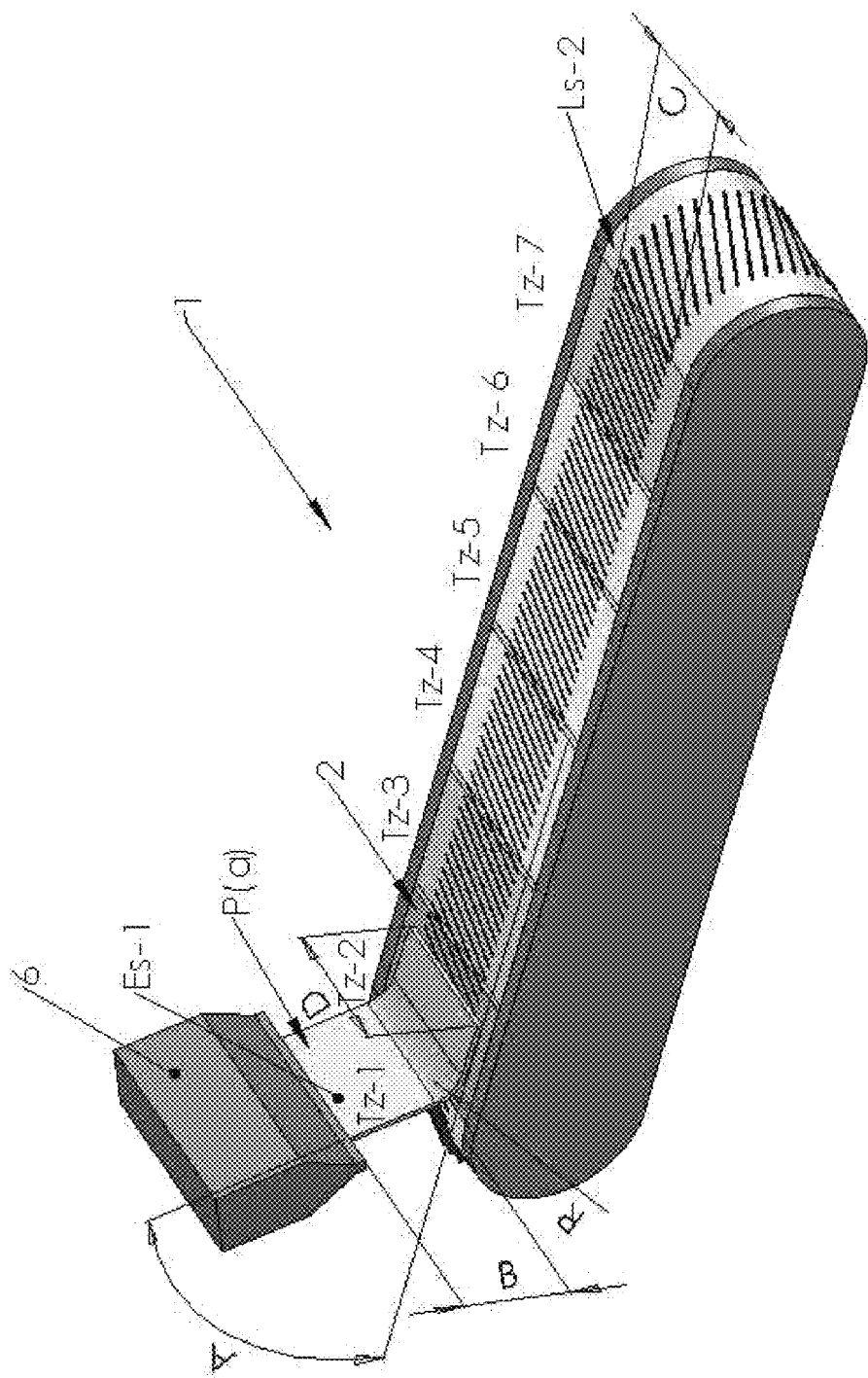
FIG. 8 is a perspective view of the embodiment of FIG. 7.
Figure 9:
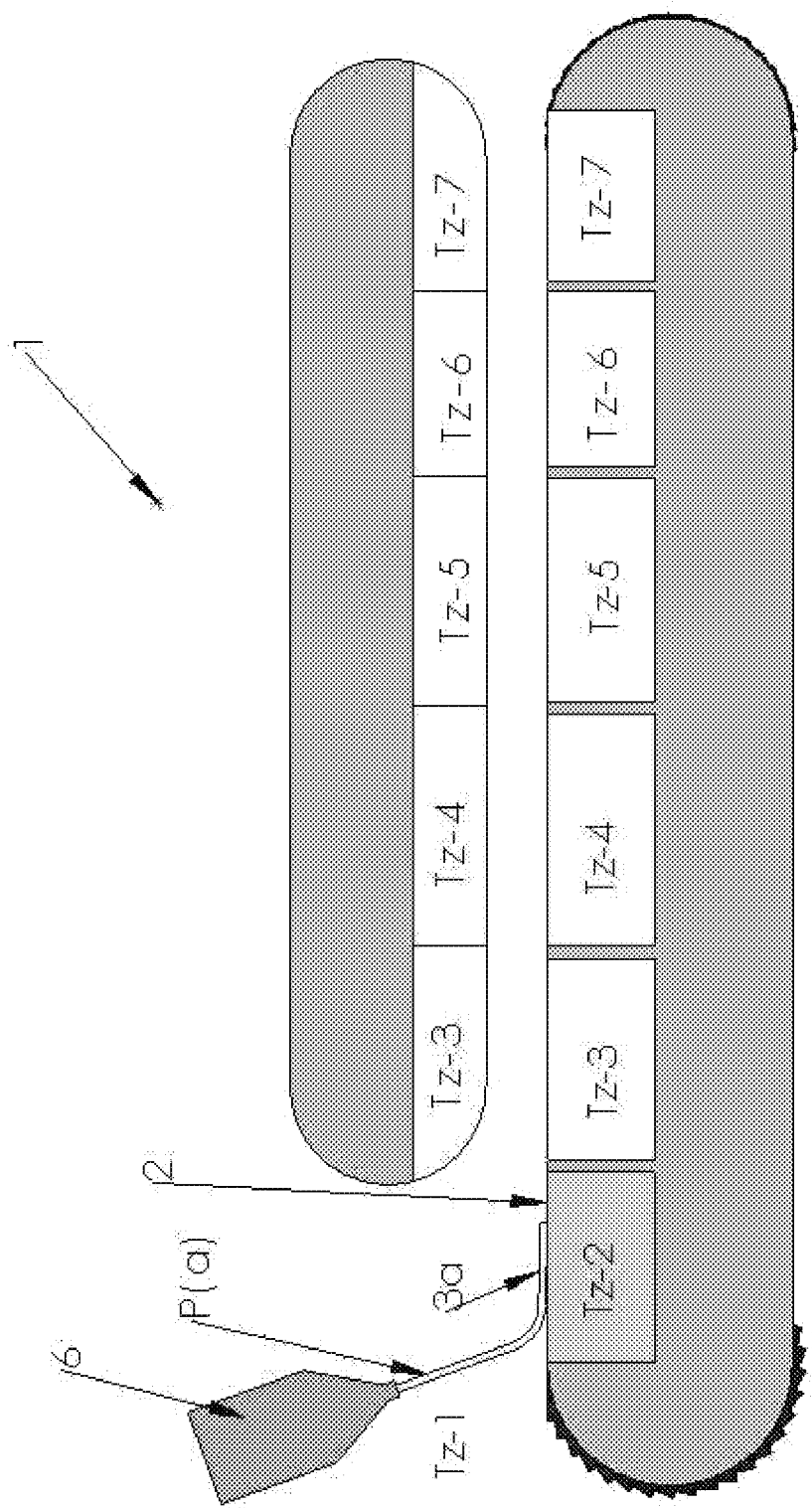
FIG. 9 illustrates an embodiment of FIGS. 7 and 8 with an upper moulding surface configuration in-situ.
Figure 10:
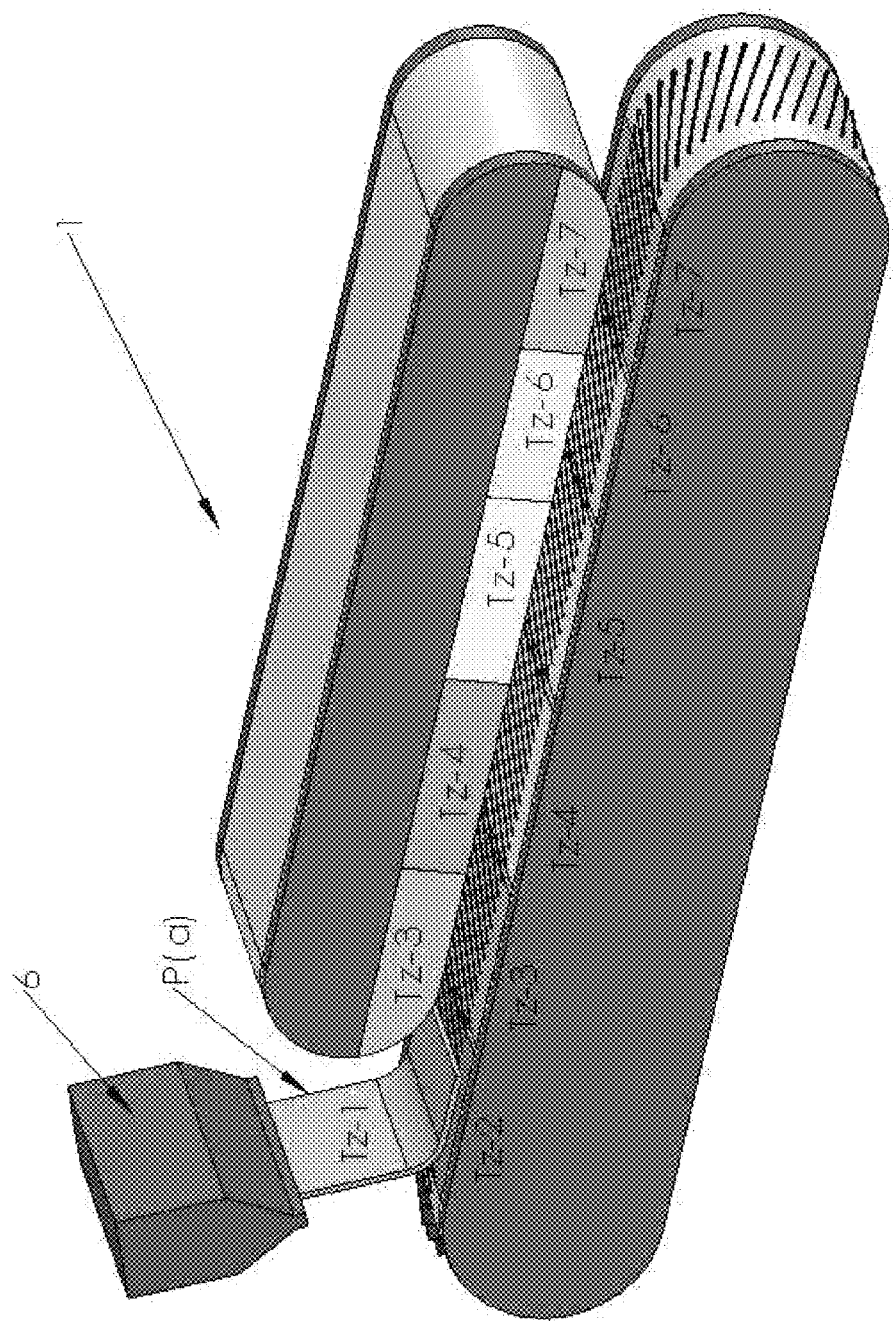
FIG. 10 is a perspective view of the embodiment of FIG. 9.

In the case of multi-layer products to be formed, the materials to be used (e.g. polymer) are elevated to above their glass transition temperatures. A first of the polymers P(a) is then continuously flowed as an extrudate onto the lower moulding surface 2 of an endless belt system 1 from an extruder head 6. The second of the polymers P(b) is likewise continuously flowed as an extrudate onto the upper surface 3a of the first polymer P(a). In this manner, dual layers of polymer are laid onto a moulding surface 2. This is the first two temperature zone segments completed. The polymers P(a), P(b) are then conveyed, whilst still above their respective glass transition temperatures, to receive application of the upper moulding surface 3 to at least the upper-most surface 3b of the upper polymer layer P(b). The upper moulding surface 3 is brought to bear and apply pressure on the polymers and formation of the upper moulding surface is performed. Pressure from the upper moulding surface 3 assists in holding the polymers in place between the moulding surfaces 2, 3. Such pressure may also be used to compress the polymers into the surface relief features of the die or moulding surface being used. Pressure is applied at the die pressure point (Dp) as indicated by FIG. 6. The surface relief features determining the pattern or three-dimension shape to be formed of the polymers. Examples of products that may be formed are described below.

'D' is the width of material flowed onto the lower moulding surface 2. The width of material can be adjusted via the extruder head 6. Width may depend on the application of product being so formed. The limiting factor for processing of the extrudate into a formed product will depend on the diameter 'C' of the moulding surface 2. Control of the flow from the extruder head 6 may also become a problem—flow control nay be assisted by inclusion of a melt pump (not shown). Clearly however, providing greater width belt systems and moulding surfaces will enable greater width product to be formed.

'A' is the angle of flow of material from the extruder head 6 to the moulding surface 2. The angle of the extruder head may be altered to alter the angle of the extrudate onto the die surface. Altering the extrudate angle assists in the flow direction that the extrudate meets the die surface. This ability to vary the die angle accommodates slight variations in extrudate and process speed and a variation of a melt flow index of a polymer when used in series with another extruder with a different melt flow index from a second extrusion head. The ideal angle for the extrudate to meet the die surface is between about 60° and about 90°. This angle range helps ensure minimal air entrapment between the extrudate and the die surface. Die angles can also be used to accommodate alignment of several dies within the available area on which to flow the polymer onto the die surface.

'R' is the turn angle at which the material flows onto the lower moulding surface. A minimal turn radius ensures minimal air entrapment between the extrudate and the die surface. The radius must not be too tight as to cause the flow of the polymer around the radius to impart stress into the polymer. As a general rule the radius should be a minimum about two times the gauge of the extrudate and no greater than about ten times the gauge of the extrudate.

'B' is the vertical height from the lip of the extruder head 6 to the surface of the lower moulding surface. The ability to adjust the height of the top die surface, the bottom die surface and the extruder die relative to the bottom die surface enables the length of the free falling extrudate onto the die surface to be controlled. The control of this extrudate length minimizes stretch/elongation of the extrudate from the gravitational weight of the polymer. Stretch/elongation would impart stress into the polymer, change the gauge of the extrudate and reduce the width of the extrudate.

'ES-1' is the linear speed at which extrudate is flowed out of the extruder head 6. The linear speed of the extrudate should be matched to the line speed of the process/belt as closely as possible. If the extrudate speed line is lower than the speed of the process/belt, the extrudate will be elongated or stretched causing the polymer to be stressed, the gauge of the extrudate decreased and the width of the extrudate reduced—commonly referred to as "neck in" of the extrudate.

If the extrudate speed line is higher than the line speed LS-1 of the process/belt, the extrudate will gather, pool, pleat or ripple and cause an uneven gauge extrudate on the die surface. For example, 'LS-1' is the linear speed or line speed (meters/minute) at which the endless belt system 1 is running.

For an application where a small process direction stretch or orientation of the polymer may be beneficial to the end product a slight increase of the process speed over the extrudate speed will induce polymer orientation. This polymer orientation may be used to provide optical properties or increased strength in the flow direction to the product being manufactured.

The linear speed (e.g. meters/minute) of extrudate from the extruder head 6 ES-1 is advantageously matched to the line speed LS-1 (e.g. meters/minute) of the endless belt system. In this manner, the material being continuously flowed onto the lower moulding surface 2 is not stretched or moved or pulled onto the moulding surface (this would be the relative difference in linear speeds between ES-1 and LS-2). This may facilitate the minimising of stress or tension applied to the extrudate. Instead, the extrudate is allowed to be laid or flowed onto the moulding surface, the moulding surface accepting the extrudate and the extrudate flowing into the surface relief features of the mould.

With reference to FIGS. 7-12 (some figures not showing upper moulding surface 3), there is shown is an endless belt system 1 comprising a lower moulding surface 2 and an upper moulding surface 3 that can be gauged and brought into contact with the upper surface 3$a$ of a polymer P(a) continuously flowed from an extruder head 6 out of an extrusion system (details not shown). The polymer P(a) is provided at above its $T_g$ such that on flowing of the polymer to the lower moulding surface the polymer assumes the shape of the mould. The process can be run according to the various temperature zones as described above.

Figure 11:
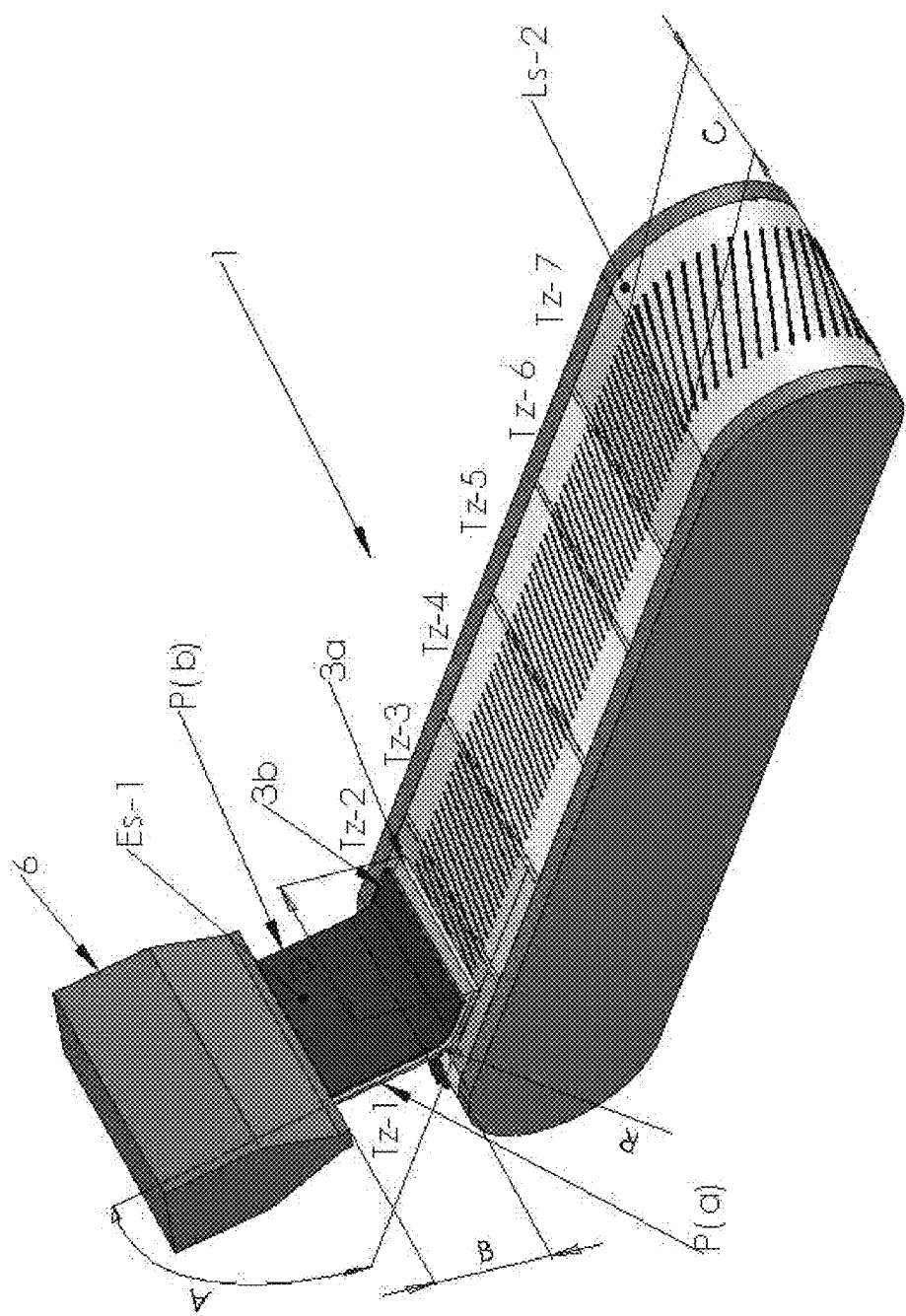
FIG. 11 is a perspective view similar to that of FIG. 8 but with a single extrusion head flowing two extrudate onto a lower moulding surface.
Figure 12:
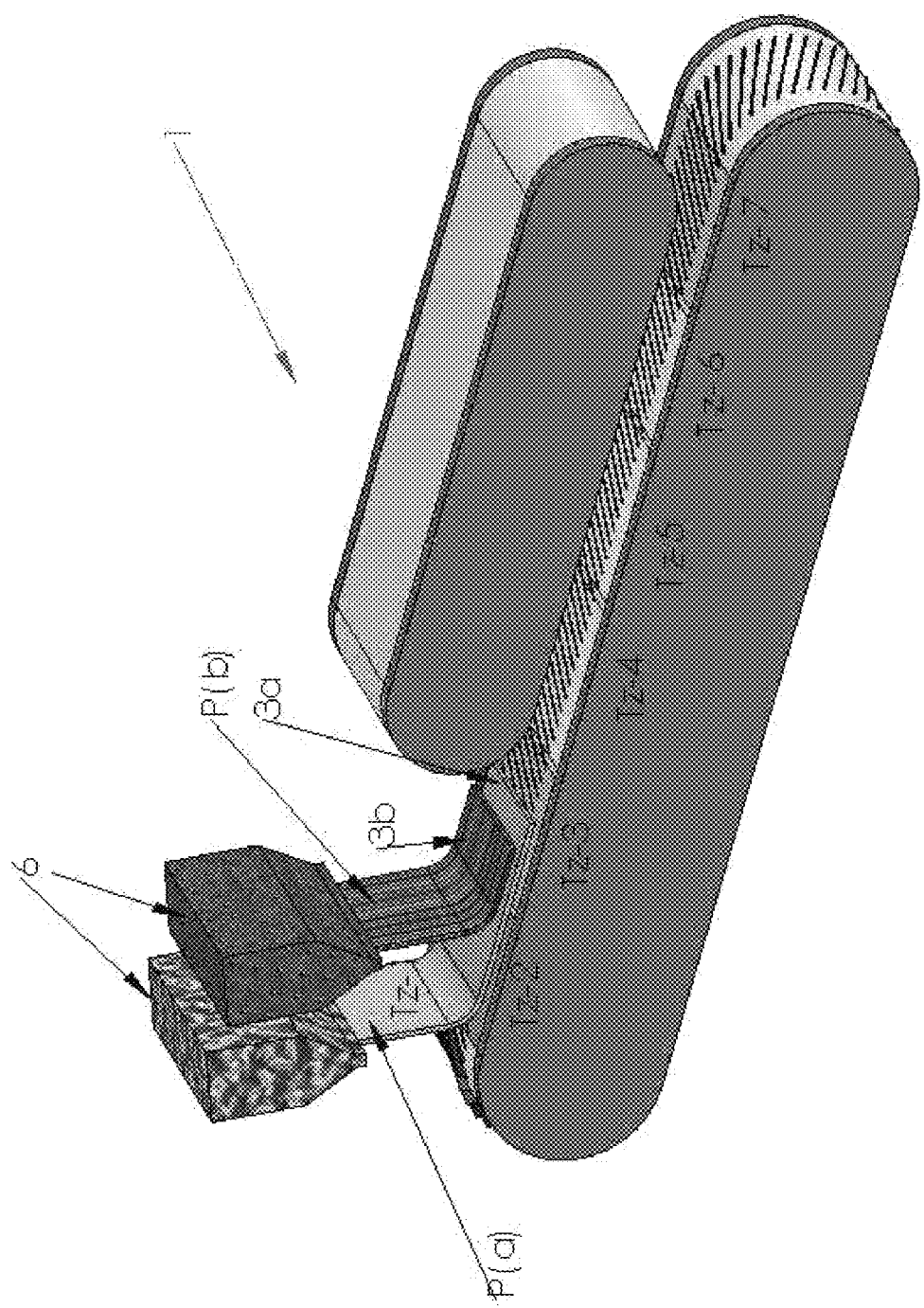
FIG. 12 is an alternative embodiment to the configuration of FIG. 11 in which two extrudate are flowed onto a lower moulding surface from a pair of extruder heads and in which an upper moulding surface is shown in-situ for application of multiple material layers according to the invention.

FIGS. 11 and 12 illustrate a further embodiment of the invention in which more than a single extrudate is to be processed. FIG. 11 illustrates a single extruder head 6 flowing dual layers P(a) and P(b) of extrudate material onto a lower moulding surface 2. FIG. 12 illustrates a pair of extruder heads 6 flowing layers of extrudate material P(a) and P(b) onto a lower moulding surface 2. It will be appreciated more than two extruder heads may be employed for additional layering of extrudate. Alternatively, extruder heads enabled to extrude multiple layers of material may be used.

Figure 13A:
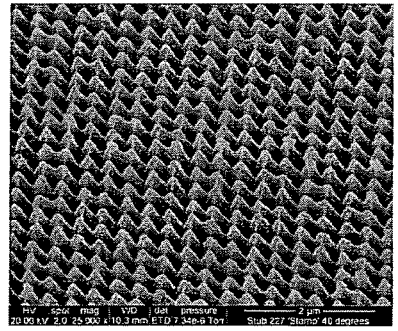
FIGS. 13a, 14a, 15a are SEM images of the moulding surfaces used to generate the formed pattern products shown in corresponding respective FIGS. 13b, 14b, 15b.
Figure 13B:
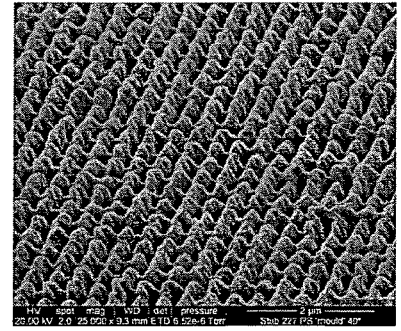
Figure 14A:
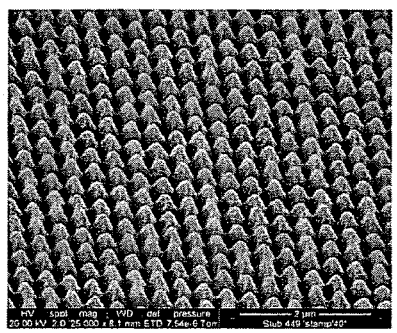
Figure 14B:
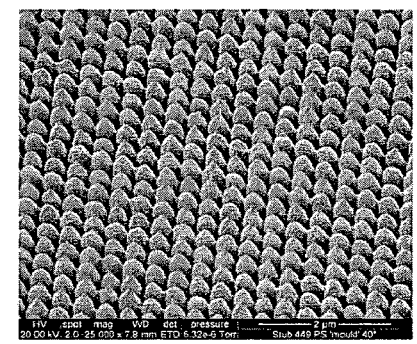
Figure 15A:
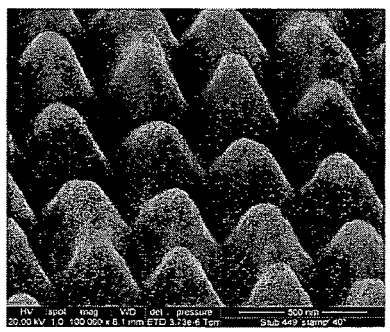
Figure 15B:
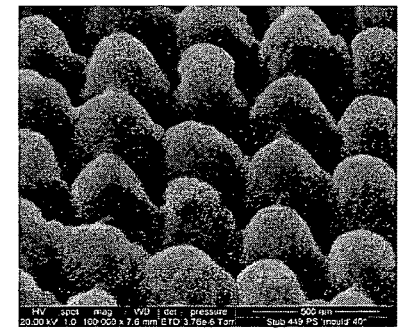

FIGS. 13$a$, 14$a$, 15$a$ are SEM images of various moulding surfaces, with corresponding FIGS. 13$b$, 14$b$, 15$b$ being their respective formed products (i.e. moulded PS).

Figure 16:
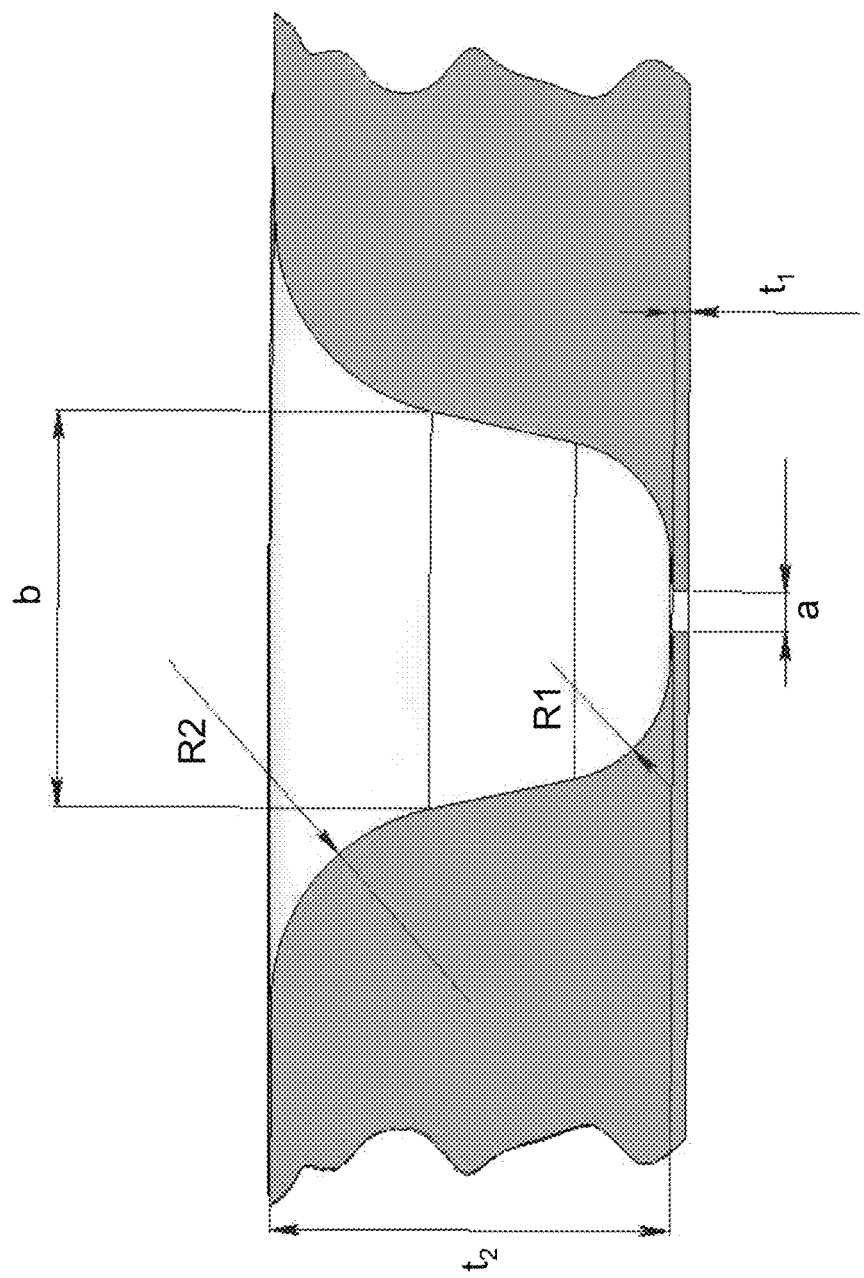
FIG. 16 is a schematic configuration of a particular moulding surface.

FIG. 16 illustrates a schematic section through one part of a moulding surface. For example, the moulding surface can be the lower moulding surface 2. Provided dimensions are an aperture 'a' (e.g. about 5 micrometers diameter), thickness of aperture $t_1$ (e.g. about 2 micrometers), height from aperture to top of moulding surface $t_2$ (e.g. about 50 micrometers), internal radius R1 (e.g. about 15 micrometers) and external radius R2 (e.g. about 25 micrometers), and opening 'b' (e.g. about 50 micrometers).

FIGS. 17-21 illustrate the mould of FIG. 16 so used when material (e.g. polymer) is either flowed onto the mould from surface $2_1$ or surface $2_{11}$.

Figure 17:
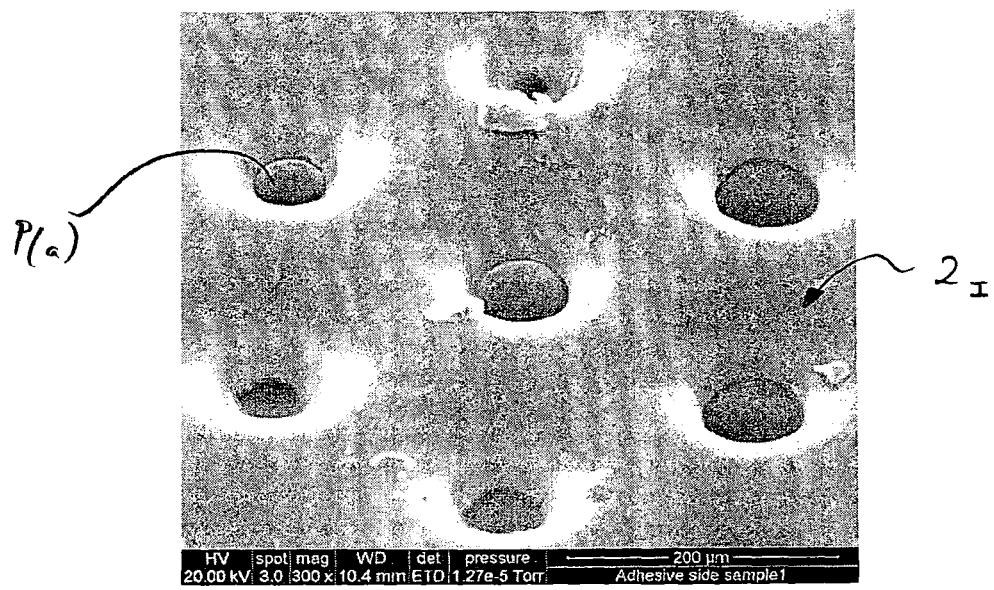
FIGS. 17-21 are SEM images of polymer flowed onto the moulding surface of FIG. 16 and products thus formed according to the present invention.

FIG. 17 is an SEM image demonstrating the ability of a low stress material (e.g. liquid polymer) to be flowed through a small aperture (a) from surface $2_1$ to fill the mould cavity. This figure exemplifies the invention's ability to pass a large volume of material through a small aperture enabling low stress high volume flow of polymer to form a high aspect ratio product. The volume of material in the cavity of the mould is over fifty times the volume of the material which may be held in the volume bounded by aperture (a) and thickness $t_1$.

Figure 18:
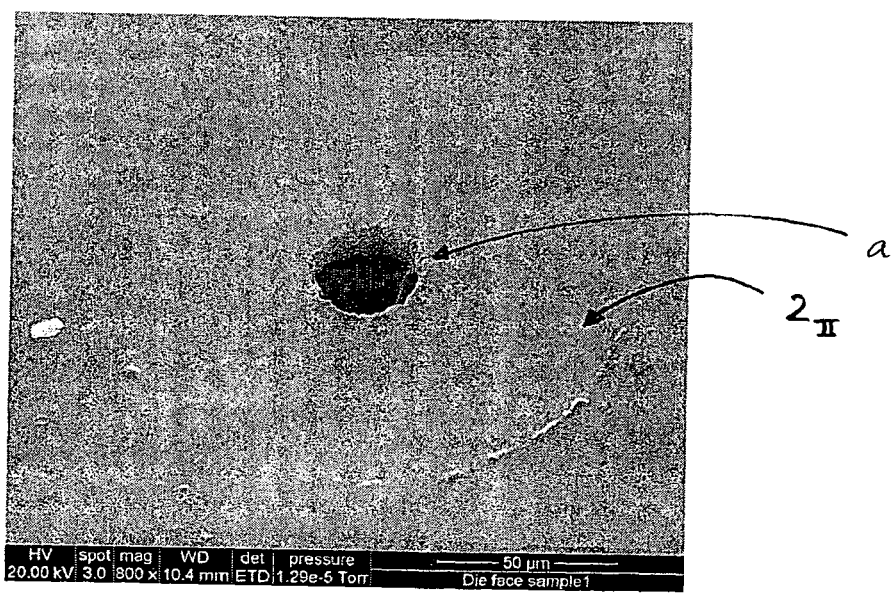

FIG. 18 is an SEM image of the moulding surface $2_{11}$ with aperture (a) shown.

Figure 19:
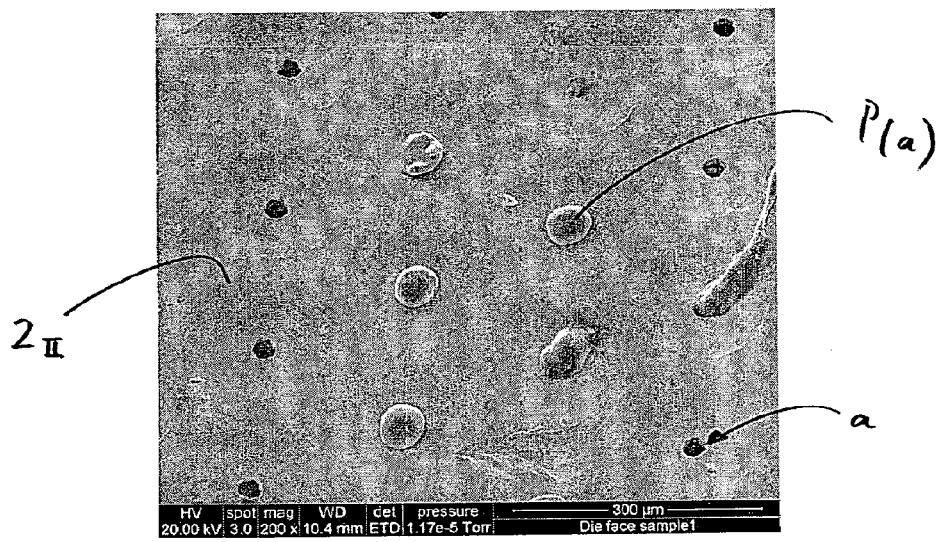

FIG. 19 is an SEM image demonstrating the ability of a low stress material (e.g. liquid polymer) to be flowed from the moulding surface $2_1$ through to the other side $2_{11}$ of the mould. Image shows a polymer P(a) flowing out of the aperture (a) at the underside surface of $2_{ii}$.

Figure 20:
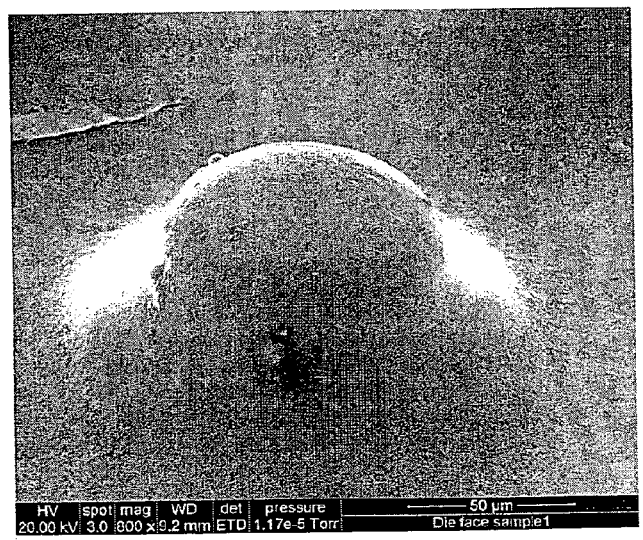
Figure 21:
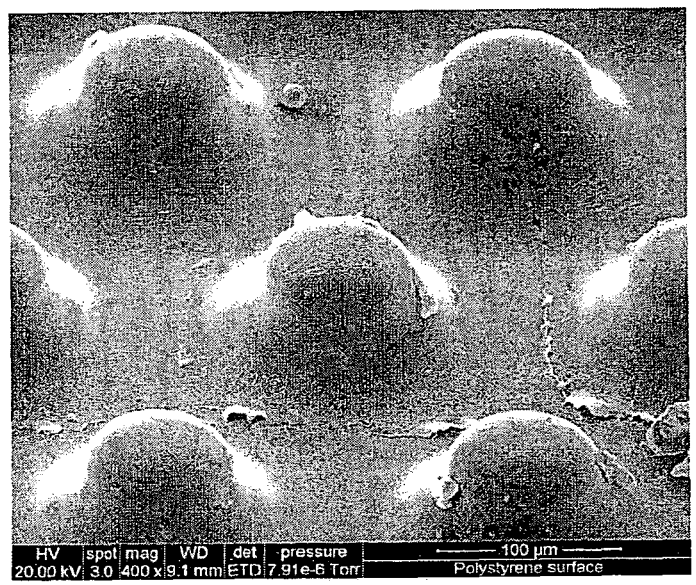

FIG. 20 is an SEM image of a formed polymer once removed from the moulding surface. The formed polymer product is the result from applying a polymer to moulding surface $2_1$, but not flowed or pushed through to extend out beyond the aperture (a). FIG. 21 is an SEM image of multiple of the products of FIG. 20, demonstrating repeatability.

In a further embodiment the method of the invention comprises of forming an item in a manner to include a surface or surfaces with surface detail at a nano or near nano-scale, said method comprising applying by flowing or laying or depositing a formable material onto a surface, and forming the material.

In another embodiment the method of the invention consists in a method of forming an item with at least one surface that includes nano-sized surface relief, said method comprising introducing onto a surface of a first platen a layer or layers of precursor material(s) to be formed, said material being in a liquid, or molten or near molten or non-rigid state when introduced, applying a pressure onto the layer(s) by way of a second platen that is displaced towards said first platen, to at least in part form the precursor material, wherein one or both platen carry or have a surface that includes nano-sized surface relief to form the material with, at least in part, a negative thereof.

The surface can be a substrate or platen receiving one side of a two-sided die or an imprinter die or a stamping mould or moulding surface. The moulding surface can be a part of a continuous forming tool (CFT), a moving belt former (MBF), an imprinter or a die or a suitable imprinter mould. The die or moulding surface is desirably a material having a relatively high heat transfer rate or high thermal conductivity. It is recognised the moulding surface may be a platen or a part of any one of, for example, a moving belt former, a stamp imprinter or a die imprinter or a stamping mould continuous forming tool.

As illustrated by FIGS. 7-12, an endless belt system can be used in operating the process of this invention. The method and apparatus described by the contents of PCT/NZ2006/000301 and PCT/NZ2006/000300 are hereby incorporated fully by reference. The method and apparatus described by those applications may be particularly suitable for implementing the present invention.

Advantageously applying the material in a manner that does not require the material (e.g.) polymer to move across the die surface, when the material is in a relaxed or a reduced stress condition allows reduced forming pressures for forming desired products. The reduction or near elimination of required forming pressures aides in minimising material stresses of deformation and may further reduce material shrinkage stresses when changing from a molten state or a liquid phase to a solid state or solid phase. For example, this invention enables the forming of moulded products having minimal surface stress or tension during the forming process which may be imparted to the product so formed. These advantages appear achievable by the use of materials that are able to be altered to a flowable state or condition prior to a forming operation. Also, the material has not been required to flow across the die surface.

For example, the material may be at or near a substantially molten state when applying to the surface of a forming tool. Alternatively, the material may be in or near a substantially liquid phase when continuously applying to the surface of a forming tool. Such characteristics allow for the flowable application of the material. In one embodiment the material may be applied to the surface by flowing until a sheet of material substantially covering the surface is achieved.

More particularly, the heat transfer characteristics of the material may at least in part contribute to the maximum depth of material able to be applied to the surface for a subsequent forming operation. However, it is anticipated the provision of a temperature controllable cooling zone can allow production of high heat capacity materials or products of increased depth or thickness in allowing the material (polymer) to reduce to below its (or their) glass transition temperatures prior to removal of the material from the moulding surface.

It particular embodiments, the material can be applied to the surface to a depth of less than about 50, 40, 30, 20, 10 mm, or less than about 5 mm, or less than about 3 mm, or less than about 2 mm. Yet further, the material is to a depth of 0.1 mm to about 3 mm. Alternatively, the depth is about 4, or 3, or 2 or 1 mm.

In another embodiment, the depth of material applied to the surface can be to a depth of at least about 0.5, 1, 2, 3, 4, 5, 6, 7, 8, 9, 10, 15, 20, 25, 30, 35 40, 45, 50 or 55 micrometers or about 56, 60, 65, 70, 75, 80, 85, 90, 95, 100, 105, 110, 115, 120, 125, 130, 135, 140, 145, 150, 155, 160, 165, 170, 175, 180, 185, 190, 195, 200, 220, 240, 260, 280, 290, 300, 350, 400, 450, 500, 550, 600, 650, 700, 750, 800, 850, 900, 950, 1000, 1050, 1100, 1150, 1200, 1250, 1300, 1350, 1400, 1450, 1500, 1550, 1600, 1650, 1700, 1750, 1800, 1850, 1900, 1950, 2000, 2050, 2100, 2150, 2200, 2250, 2300, 2350, 2400, 2450, 2500, 2550, 2600, 2650, 2700, 2750, 2800, 2850, 2900, 2950, 3000, 3500, 3550, 3600, 3650, 3700, 3750, 3800, 3850, 3900, 4000, 4050, 4100, 4150, 4200, 4250, 4300, 4350, 4400, 4450, 4500, 4550, 4600, 4650, 4700, 4750, 4800, 4850, 4900, 4950, 5000 micrometers or 0.1 millimeters to about 3 millimeters and useful ranges may be selected between any of these values (for example, about 0.5 millimeters to about 3 millimeters, about 0.2 millimeters to about 2 millimeters).

In another embodiment, where the material is polystyrene, its temperature can be controlled to be about 230° C. on contact with the surface, and where the material is polycarbonate its temperature can be controlled to be about 300° C. on contact with the surface. Temperature control can be achieved by any manner of heat regulatory systems, for example electrical heaters or heat exchangers. Temperature control of the surface or of parts of the forming tools can also be controlled. Again, these may be by temperature regulators such as electrical heating systems, infra-red (IR) or other heat exchangers, for example hot oil systems for heating of platens of a forming tool. It will be understood that other methods of heating surfaces or maintaining surface temperatures is contemplated and not limited to those systems described herein only.

It is also contemplated that the material may be temperature controlled according to predetermined material rheological characteristics, for example to control the physical properties of the material such as to a molten or semi-molten or liquid phase depending on its viscosity or malleability at particular temperatures.

In controlling of the temperature of the material before a forming operation it may be considered that inputting energy to the material to form a semi-molten, molten or liquid phase of material and allowing the material to collect and pool may assist in subsequent flowing or lying of the material onto the surface. The material can be supplied to the surface in a semi-molten, molten or liquid phase. Alternatively, the material may be supplied to the surface in a sheet form.

Suitable materials may involve one or more of: a molten mouldable material, a thermoformable material applied at a thermo-formable temperature, a thermoformable material to be heated by the surface or a forming tool or tools to a formable condition, a thermoformable material or molten mouldable material to be cooled by the surface or a forming tool or tools or otherwise, a thermoformable material to be thermoset by the surface or a forming tool or tools, and any of the foregoing together with one or more material of a different character.

It is contemplated the present invention can be used with any flowable material, or a plastically deformable material such as for example polymers and metals. However, most preferred materials include thermosetting polymers or thermoplastic polymers. Polymeric materials may include hydrocarbonaceous materials, including polymeric materials comprised of plant derived oil materials as recent trends suggest will become more widely available. It is also appreciated those materials for use with the method of the present invention should be able to be able to be applied to the surface at their thermoformable temperature.

Particularly suitable and contemplated materials include, but are not limited to the following, polymeric composites, polycarbonates (PC), polystyrenes (PS), general purpose polystyrenes (GPPS) or polymethyl methacrylates (PMMA). Materials that may be particularly suitable for optical media applications include, but are not limited to the following: ultraviolet stabilised thermoplastic polyurethanes, polycarbonates, polymethyl methacrylates, or general purpose polystyrenes. Other suitable materials include conductive polymers and polymers suitable for wound dressings.

Examples of metals metal alloys, pure metals, metallic oxides (such as for example ceramics that may be sintered as part of a forming process or a subsequent process step to a forming operation), non-crystalline ceramics, crystalline ceramics, non-oxide ceramics such as for example carbides, borides, nitrides or silicides, or composites of these for example particle reinforced or combinations of oxide and non-oxide ceramics. Where for example metallic oxides are to be used, such as oxides of alumina or zirconia, ceramics are to be formed, the forming step may provide for forming of a green body or intermediates of a green body and a sintered item.

Some further examples of ceramics, optionally provided in a slurry form or on a supporting substrate for subsequent forming operation may include: Barium titanate (often mixed with strontium titanate), Bismuth strontium calcium copper oxide, Boron nitride, Ferrite ($Fe_3O_4$), Lead zirconate titanate, Magnesium diboride ($MgB_2$), Sialons/Silicon Aluminium Oxynitrides, Silicon carbide (SiC), Silicon nitride ($Si_3N_4$), Steatite (magnesium silicates), Titanium Carbide, Uranium oxide ($UO_2$), Yttrium barium copper oxide ($YBa_2Cu_3O_{7-x}$), Zinc oxide (ZnO), Zirconium dioxide (zirconia). Suitable materials may desirably meet the flowable characteristic requirements.

It should be appreciated the skilled person will understand there are numerous other materials not listed here that will operate effectively with the present invention and that the present invention is not limited to those illustrative examples described herein.

Advantageously the material can be temperature controlled before applying to the surface. Alternatively the material can be temperature controlled when applied to the surface. In yet a further alternative embodiment the material can be temperature controlled before applying to the surface and temperature controlled when applied to the surface.

Temperature control can be achieved by measuring the temperature of the material and adjusting it by heaters. The heaters can be direct heaters, such as an electrical heater immersed in the material, or can an indirect heater(s) such as a heat exchanger imparting heat from a heat transfer fluid through a conductive surface to the material to be heated (e.g. a shell and tube heat exchanger).

It should also be appreciated the surface or surfaces of the forming device (MBF, CFT, die or mould) can be heated to maintain temperature of the material to be formed or being formed. Provision of a heated surface may also assist in slowing the cooling or annealing of the material or rate of freezing of the material to below the $T_g$ of the material being processed before, during or after a forming operation.

The surface used for the forming operation can be configured or arranged according to predetermined products to be formed. The imprinting or forming surface can be formed of metal coated nanotubes arranged or configured as desired, although other surface mould methods are also contemplated for us in this invention.

Advantages of using a continuous forming tool (CFT) such as that described in the PCT applications referenced above may include one or more of: the ability to vary the pressure in the forming zone, lateral and axial expansion of forming blocks, raising and lowering of bottom track/platen with moulding surface, ability to vary clamping pressure of the machine between runs and over the length of track.

CFT manufacturing technology can be used for flat sheet and many other profiles, for example, three-dimension shapes, asymmetric forms and is not limited to axially symmetric forms (for example pipes) or optical lenses. Further advantages of this manufacturing technology include: accommodating of intermediate processes, such as injection moulding, part insertion, top and bottom tracks/platens can differ in length and speed, high degree of accuracy alignment of mating dies, ability to control temperature of each forming block and/or each track separately, high forming speeds, forming block side plates take load, not faces and edges of forming blocks, can work with molten and semi-molten material(s), liquid or semi-liquid material(s) flow form to bottom die and then are pressure formed, very small shapes can be imprinted, at least down to or even below 1 nanometer in width or depth, and the capability of having non-linear pressure forming zones.

The present invention advantageously provides for the flowing or lying of a polymer continuously on to a die or moulding surface in a way that the polymer does not flow across the die or moulding surface. The die or moulding surface is controlled or allowed to be at or close to the temperature of the polymer, the polymer being at or close to its liquid phase. The polymer is applied and held on the die or moulding surface in a manner such that the polymer is not moved across the die or moulding surface, the polymer moving due to gravity but not any other forces. The polymer is held in its form in the mould for a sufficient time until a compression moulding force is applied.

Desirably, the process of the invention is designed to impart minimal stress into the polymer during forming. This is because the polymer is provided to the die or moulding surface when in a relaxed state, preferably its most relaxed state possible (i.e. liquid phase) and the amount of movement of the polymer is minimalised by only taking up the surface pattern of the die or moulding surface. This is possible as the polymer is as close to its liquid phase as possible and is laid directly fully across/onto the die or moulding surface. The polymer need not be moved significantly across the mould surface to form the surface pattern or relief. Instead, the upper die or moulding surface is used to apply minimal pressure, for example in the range of 1-3 kg/cm², to finish or move the polymer into the form of the surface pattern or relief of the moulding surface.

According to the invention, the forming zone can be an extension of the heating zone. The cooling zone is only initiated or begins once the polymer to be formed has been "shaped". In comparison to existing processes, normally the cooling zone is provided immediately on exit or after exiting the extruder or injection moulder. Further, the process of this invention is able to transfer a liquid phase polymer into a compression zone at sufficient speed and to maintain the polymer in its liquid phase without significant movement of the polymer across the die or moulding surface, The process imparts almost no stress in the polymer during forming—this is due to the polymer being in liquid phase, totally relaxed, minimal movement of the polymer across the die surface, the temperature of the die surface during forming being close to the polymer temperature, a controlled cooling cycle and the high speed of the forming process. The polymer is not injected or subjected to high forces/pressures or large flow paths.

Low stress also results in the ability to remove the die from the polymer whilst the polymers temperature is still relatively high and during final cooling the shape is not distorted. This is because there is little or no internal stress in the material formed. Products produced have lower chance of distortion in use—particularly in elevated temperature and/or exposure to chemicals—causing relaxation of any internal polymer stress, such as shear stress or forming stresses—which otherwise cause distortion of patterns formed.

Low stress also results in the ability to form flexible materials (e.g. TPU) with high compressibility into micron and sub-micron patterns—these patterns a normally lost when released from a mould which has applied compressive force to form the patterns.

The use of a highly thermally conductive die or moulding surface enables the die surface to rapidly take up or be increased or adjusted to the polymer's temperature on application to the die surface. Likewise, such a die or moulding surface is then able to allow cooling or heat transfer away from the polymer when in contact with the die surface.

Advantageously, this invention enables the forming the polymer with pressure from about 1 kg/cm² to about 3 kg/cm², although as previously described other pressures or pressure ranges may be used in the process. These particular forming pressures are relatively very low compared to known forming techniques. Known techniques for injection moulding are often in the region of about 260-350 kg/cm².

As described previously, the ability to form multiple polymers on the moulding surface is enabled with this invention, for example the forming of two polymers simultaneously is possible. Able to pattern both sides of a product at the same time and align the patterns or moulding surfaces to produce a desired formed product. The alignment of patterns on either side of the extrusion is achieved through the alignment the die surfaces. Alignment can be controlled either through physical alignment of the surfaces by using taper interference or other common physical methods or by controlling the location and relative speeds of the die surfaces through sensor feedback from the die surfaces. Aligning the patterns on either side of a product may be used to enhance the optical properties of the product.

Able to form multi-layer laminations of different polymers and apply different patterns to the two outer surfaces which may be different polymers—one polymer/surface could provide UV stability and have patterns providing a non-reflective surface and the other polymer/surface could provide chemical resistance with an increased surface area for applying an active coating—e.g. an electrode.

The forming of high aspect ratio products is possible due to the minimal polymer flow across the moulding surface and the die surface temperature which allows the polymer to flow into the surface pattern or relief cavities of the die or moulding surface under the polymer's own weight with minimal additional compressive moulding force (low stress) required. Aspect ratios of about 10:1 or even up to 20:1 or even greater are achievable (depth:width of surface relief).

The invention further provides for a process which can vary heating zones HZ and cooling zones CZ time and length, the extruder die height, the speed differential between the extrusion melt from the extruder die head and the process speed to control extrusion gauge and width, including speed control to vary the radius of the extrusion melt applied onto the die or moulding surface.

Production rates of formed product at linear line speeds of around 36 meters/minute (or greater) are achievable. Existing forming techniques, for example of nano-scale relief formed structures, is significantly less than this (existing techniques for production rates of nano-scale forms structures are in the region of about several square meters per day). In contrast, the present invention may readily achieve production of around 25,000 $m^2$ per day (at operational conditions of a 36 m/minute on a 500 mm wide moulding surface operated for 23 hours per day).

Further advantages include the ability to reduce and/or tune and/or control the gauge of the extrusion by speeding up the draw-off rate through a speed differential between the extrusion speed ES-1 and the die surface speed or line speed LS-2.

Adjusting the variables in relation to process speed, length of heating time, length of cooling time, width of process and productivity can all be used to produce desired products. A limiting factor in operation of the invention is currently understood to be extrusion speed, although this may be increased as control of extrudate flow is improved.

This invention is considered appropriate for those materials, such as polymers, capable of extrusion, including processing of a wide range of polymer viscosities, from about 1 MFI to about 50 (or even greater) MFI (MFI being the 'melt flow index'). Typically this is not possible with other techniques, such as in extrusion, hot embossing or injection moulding.

Extrusion gauges from about 10 (or less) micrometers to about 20 mm are contemplated, including the patterning of large surface areas, such as for example about 3 m in width or may be wider than this depending on the necessary application or machine or moulding surface to be used. In addition the present invention is enabled for the patterning across the total width D of an extrudate. In comparison, other production processes are usually only capable of producing up to about 8" (inch) width products (e.g. wafers).

A continuous process, both a continuous feed of polymer in to the process and a continuous product production, is possible with no joins in the pattern or surface relief pattern being so formed.

Further, the product being formed can be moulded by the moulding surfaces around three-dimensional surfaces, not just flat or planar surfaces.

The present invention further contributes to the ability to combine normally non-compatible materials due to their different processing requirements (e.g. glass transition temperatures or MFI or melt flow viscosity at once). Examples of these include multi-layer formed products of polycarbonate (PC) with thermoplastic polyurethane (TPU).

It is considered that a majority of the forming of the product to be formed occurs by the liquid polymer assuming the surface relief or pattern of the moulding surface when initially flowed onto the surface, gravity assisting in moving the liquid polymer into the mould before any subsequent mechanical force is applied by the compression step of the upper moulding surface.

The present invention avoids other problems in the prior art, such as "roll-stack chatter" which is apparent under normal extrusion roll stack processing. "Chatter" occurs due to differential speed between the roll stack's rollers during the forming due to pressure, motor dive control and friction influences.

Ability to vary temperature zones—cooling/heating—reheating and re-cooling (annealing), very small differential temperatures between polymer and die surface, very large differential temperatures, very gradual decrease in a particular zone (e.g. forming zone and first cooling zone until below glass transition temperature Ability to vary temperature onto top or bottom surface of extrusion—may require different temperatures for either different polymers or different patterns—could also be utilized to provide uniform or un-uniform "crystallization" of polymer (particularly useful with optical substrates or for cross linking polymer on one surface—e.g. crystalline polyethylene terephthalate (CPET)).

Able to bring together two polymers which will not adhere to each other—form holes through the first layer and partially into the second layer with the die surface (pins shapes for example), once removed from the process and the die surface the two layers are delaminated (separated) leaving one layer with holes completely through. An example of the materials could be thermoplastic polyurethane (TPU) as a first layer and polypropylene (PP) as a second layer.

In a suitable endless belt system or other apparatus for operating the present invention there would be the ability to vary the extrusion die height (B) and angle (A).

The method according to the present invention can facilitate the forming of one or more of the following types of items: membranes for separation such as for separation of components from or within water, chemicals, gases, blood, or use within fuel cells, sensor devices, light diffusers, light emitters, wave reflecting or absorbing such as radar etc., electronic circuits or circuitry, particle alignment or aligning technologies, water repellents or water repelling technologies such as hydrophobic materials, optical media such as a liquid crystal display ("LCD") or a compact disc ("CD") or a digital video disc ("DVD") technology or a photo-voltaic cell, memory storage devices, medical devices such as for skin repair or wound repair (e.g. bandages), drug delivery mechanisms or devices, reduced (low) friction surface materials, increased (high) friction surface materials, lamination technology, radio frequency identification ("RFID") chips, conductive polymer layers/products/circuits, light bending technologies such as negative light reflections. Particularly preferred items may include forming of or precursors for optical media such as photovoltaic cells, compact discs (CD), digital video discs (DVD), liquid crystal displays ("LCD") or elements of conductive circuits or circuitry, including non-reflective or anti-reflective patterns or films for subsequent metalizing and removal of the formed material to leave a metal negative image of the formed material (for example the formed product can be used to for the base for a subsequent metallisation treatment).

It will be appreciated by the skilled artisan that there may be other items that may be manufactured according to the present invention that are not specifically listed above.

In another embodiment of the present invention the items above can be formed from a material precursor that is laid or applied onto one platen of a press to be formed in conjunction with at least one other platen pressed toward one another, wherein the items may be subsequently formed. Such items can be formed where the present invention forms a part of an overall manufacturing process or is an intermediate part of a manufacturing process or which provides for a material or precursor for manufacturing of an item. It will be understood by the skilled artisan that the present invention may find application as part of other manufacturing processes or procedures.

Example 1

Figure 2:
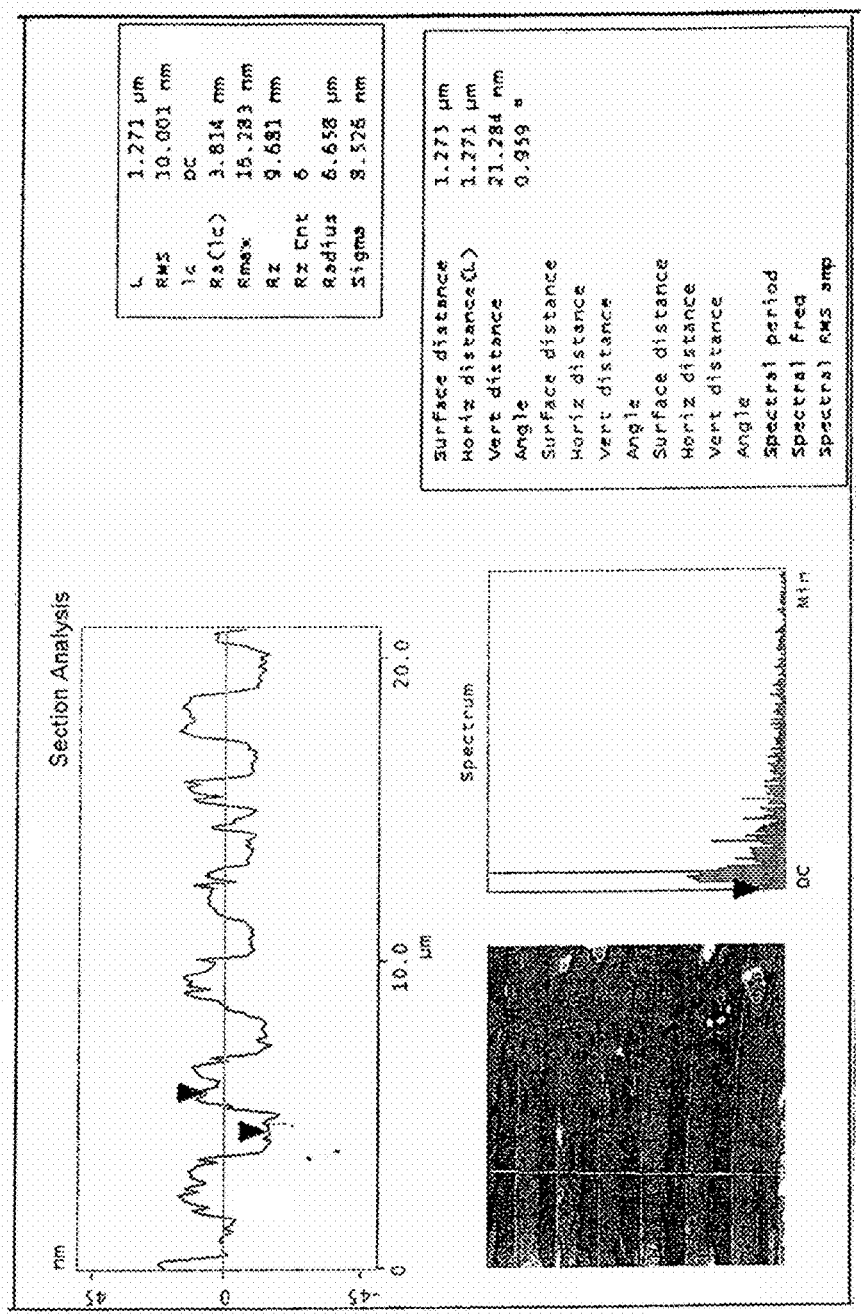
FIG. 2 is an atomic force microscope measurement of the product illustrated by FIG. 1.
Figure 3:
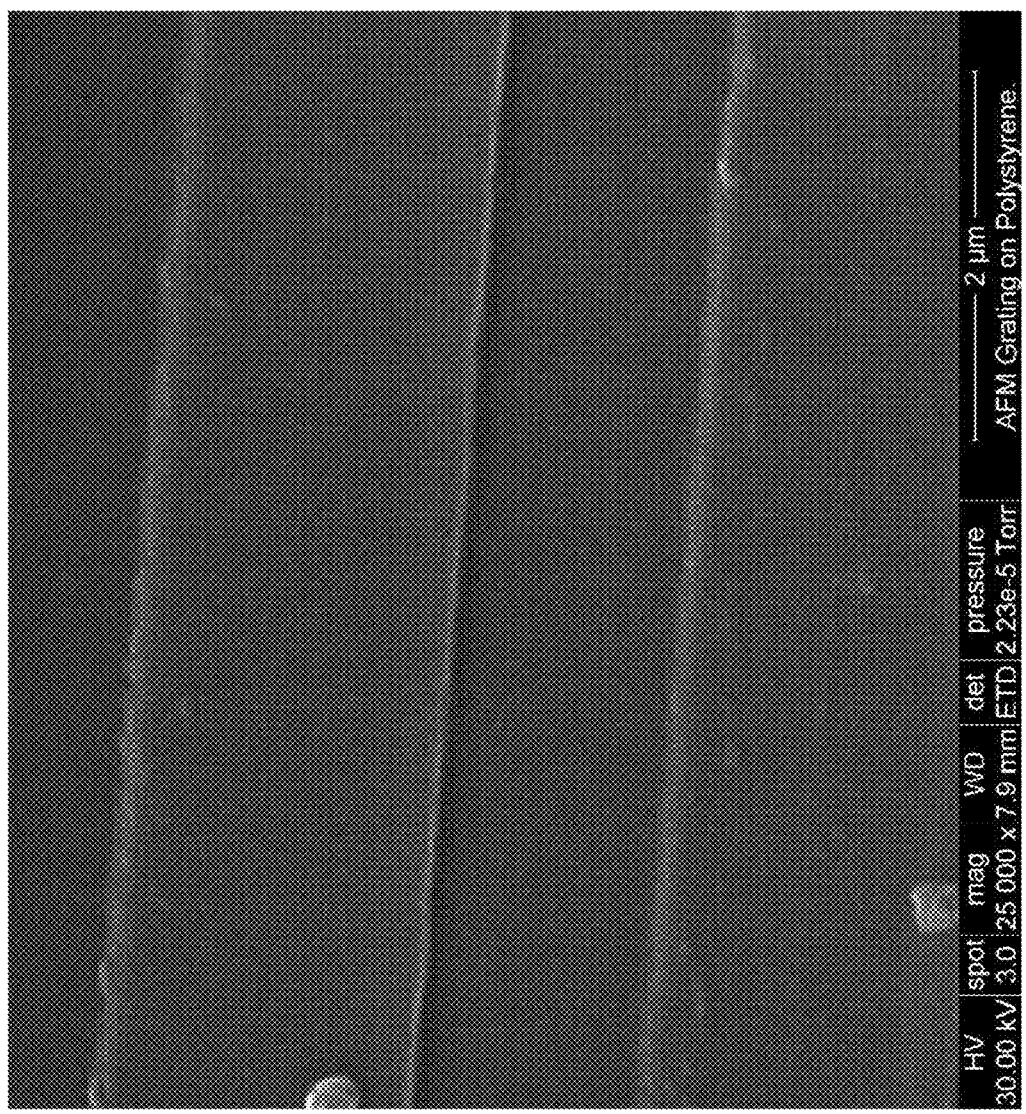
FIG. 3 is an atomic force microscope image of a part of the product illustrated by FIG. 1.

Polystyrene is: (i) heated and maintained at a temperature of 230° C., (ii) the heated polystyrene is transferred and applied to a surface of a continuous forming tool, such as the surface labelled 26 or 24 of PCT/NZ2006/000300 and formed according to the method of PCT/NZ2006/000301, (iii) a pressure of between about 1 kg/cm² to about 3 kg/cm² is applied to the material on the surface, (iv) pressure is released by separation of the forming surfaces, thereby releasing the item or product thus formed. The product thus formed is that shown in FIG. 1 with product analysis shown in FIG. 2 and an atomic force microscope image of a part of the product shown in FIG. 3.

Example 2

Figure 4:
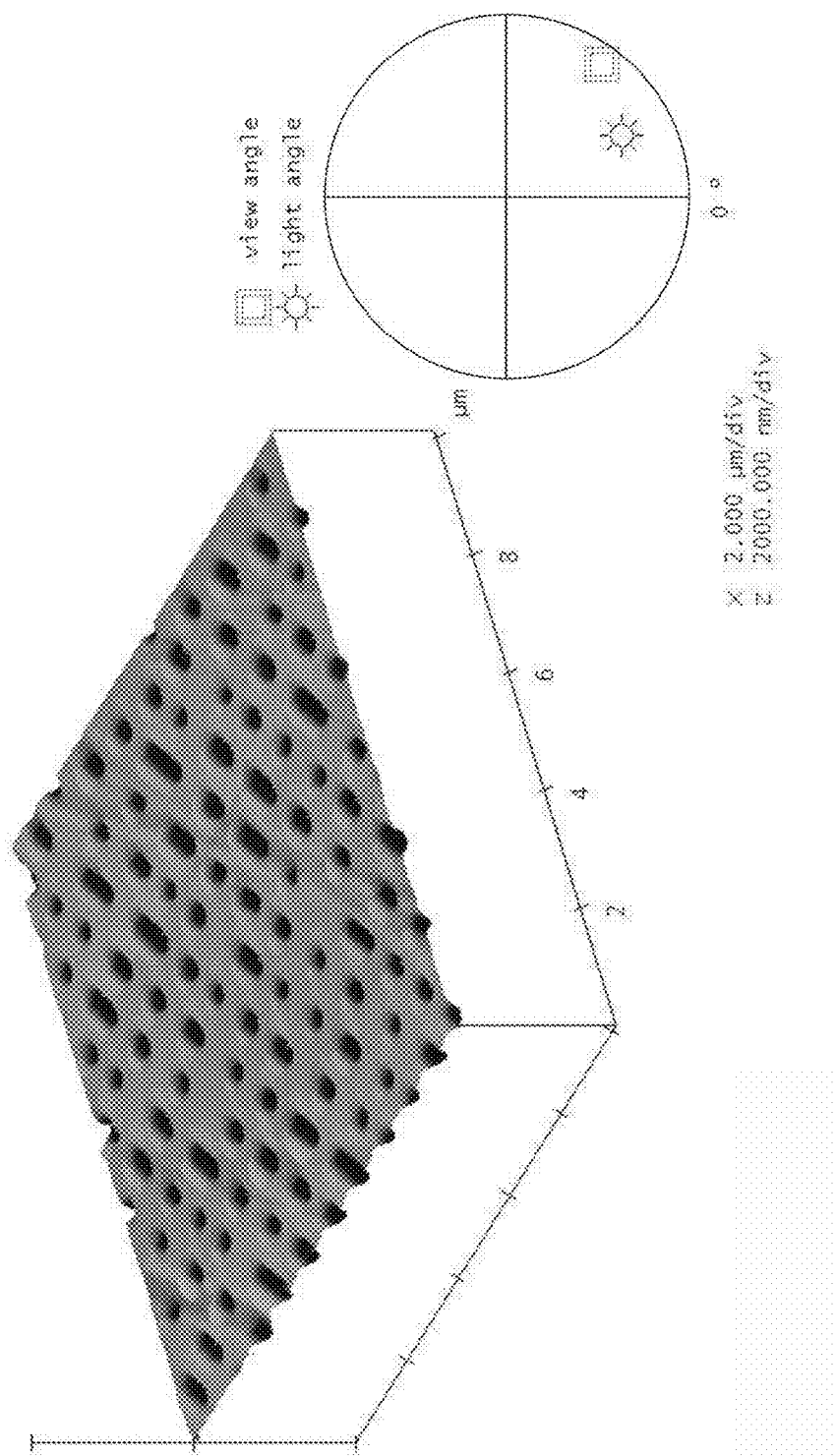
FIG. 4 is a nano/micron size (DVD) scanning electron microscope image of a nano-scale product formed according to the present invention.
Figure 5:
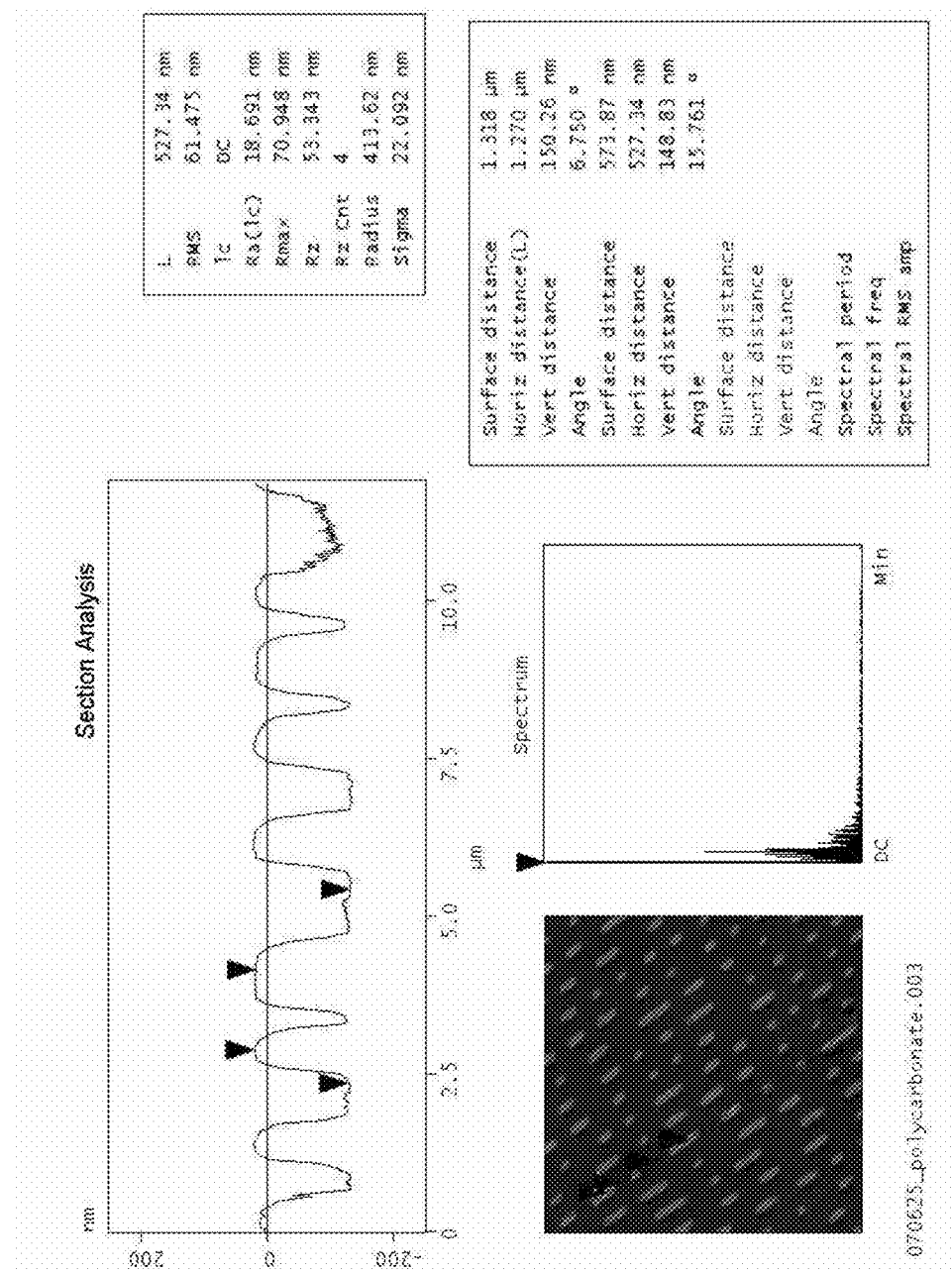
FIG. 5 is an atomic force microscope measurement of the product illustrated by FIG. 4.

Polycarbonate is: (i) heated and maintained at a temperature of 300° C., (ii) the heated polycarbonate is transferred and applied to a surface of a continuous forming tool, such as the surface labelled 26 or 24 of PCT/NZ2006/000300 and formed according to the method of PCT/NZ2006/000301, (iii) a pressure of between about 1 kg/cm² to about 3 kg/cm² is applied to the material on the surface, (iv) pressure is released by separation of the forming surfaces, thereby releasing the item or product thus formed. The product thus formed is that shown in FIG. 4 with product analysis shown in FIG. 5.

Example 3

Polymethyl methacrylate (PMMA) is: (i) heated and maintained at a temperature of between 190-240° C., (ii) the heated PMMA is extruded from an extruder head and flowed in a continuous flow on to the lower moulding surface at a depth or thickness of 1 mm of a moving belt former (MBF) or an endless belt or a continuous forming tool (such as the surface labelled 26 or 24 of PCT/NZ2006/000300 and formed according to the method of PCT/NZ2006/000301), the PMMA is held on the moulding surface and retained or allowed to remain above its glass transition temperature ($T_g$ PMMA~105° C.), (iii) the upper moulding surface is applied to the upper surface of the PMMA held on the lower moulding surface, the upper moulding surface exerting a pressure of between about 1 kg/cm² to about 3 kg/cm² to the PMMA material, (iv) pressure is released by separation of the forming (or lower and upper moulding) surfaces, thereby releasing the item or product thus formed.

The table below provides further details of the processing parameters of this example. It should be appreciated this example may be applied across a wide range of materials to be formed according to this invention. Aside from using alternative materials having different physical properties, the other processing parameters may be altered depending on the material to be processed.

TABLE 1

PMMA processing parameters

| Material | Melt Flow Index (MFI) Avg. Melt Flow, g/10 min @230° C. & 3.8 kg | Extrusion melt temp. (° C.) | Glass transition temperature (° C.) | Thickness of extrusion (mm) |
| --- | --- | --- | --- | --- |
| PMMA | 1-3 | 190-240 | 105 | 1 |

| Extrusion Angle - A (degrees) | Extrusion Head Height - B (mm) | Extrusion Radius - R (mm) | Extrusion width - D (mm) | Surface Die width - C (mm) [mould surface] |
| --- | --- | --- | --- | --- |
| 60°-90° | 10-50 | 5 | 500-505 | 500 |

| Extrusion Speed - 1 (metres/minute) | | Line Speed - 2 (metres/minute) | |
| --- | --- | --- | --- |
| 10 | | 10 | |

TABLE 2

PMMA temperature variation across process

| Material | Temperature Zone 1, TZ-1 (° C.) | Temperature Zone 2, TZ-2 (° C.) | Temperature Zone 3, TZ-3 (° C.) | Temperature Zone 4, TZ-4 (° C.) | Temperature Zone 5, TZ-5 (° C.) | Temperature Zone 6, TZ-6 (° C.) | Temperature Zone 7, TZ-7 (° C.) |
| --- | --- | --- | --- | --- | --- | --- | --- |
| Polymethyl methacrylate (PMMA) | 190-240 | 190-240 | 140-180 | 90-120 | 70-90 | 50-70 | 20-50 |

With reference to FIG. 6, table 2 above provides details of the approximate temperature profile of PMMA material being processed as it is processed according to this invention. Temperature zones TZ-1, TZ-2, TZ-3, TZ-4, TZ-5, TZ-6, TZ-7 correspond to the various zones of the process illustrated by FIG. 6. FIG. 6 provides graphical representation of the temperature profile of a material as it passes through the process of the invention.

Example 4

Polystyrene (PS) is: (i) heated and maintained at a temperature of about 230° C., (ii) the heated PS is extruded from an extruder head and flowed in a continuous flow on to the lower moulding surface at a depth or thickness of 1 mm of a moving belt former (MBF) or an endless belt or a continuous forming tool (such as the surface labelled 26 or 24 of PCT/NZ2006/000300 and formed according to the method of PCT/NZ2006/000301), the PS is held on the moulding surface and retained or allowed to remain above its glass transition temperature ($T_g$ PS~100° C.), (iii) the upper moulding surface is applied to the upper surface of the PS held on the lower moulding surface, the upper moulding surface exerting a pressure of between about 1 kg/cm$^2$ to about 3 kg/cm$^2$ to the PS material, (iv) pressure is released by separation of the forming (or lower and upper moulding) surfaces, thereby releasing the item or product thus formed.

TABLE 3

PS processing parameters

| Material | Melt Flow Index (MFI) (ISO 1133) | Extrusion melt temp. (° C.) | Glass transition temperature (° C.) | Thickness of extrusion (mm) |
|---|---|---|---|---|
| Polystyrene (PS) | 1-3 | 230 | 100 | 1 |

| Extrusion Angle - A (degrees) 60°-90° | Extrusion Head Height - B (mm) 10-50 | Extrusion Radius - R (mm) 5 | Extrusion width - D (mm) 500-505 | Surface Die width - C (mm) [moulding surface] 500 |
|---|---|---|---|---|
| | Extrusion Speed - 1 (metres/minute) | | Line Speed - 2 (metres/minute) | |
| | 10 | | 10 | |

TABLE 4

PS temperature variation across process

| Material | Temperature Zone 1, TZ-1 (° C.) | Temperature Zone 2, TZ-2 (° C.) | Temperature Zone 3, TZ-3 (° C.) | Temperature Zone 4, TZ-4 (° C.) | Temperature Zone 5, TZ-5 (° C.) | Temperature Zone 6, TZ-6 (° C.) | Temperature Zone 7, TZ-7 (° C.) |
|---|---|---|---|---|---|---|---|
| Polystyrene (PS) | 210-230 | 210-230 | 160-180 | 120-140 | 80-100 | 40-60 | 10-30 |

The foregoing description of the invention includes preferred forms thereof. Modifications may be made thereto without departing from the scope of the invention.

The invention claimed is:

1. A method for forming a polymer to define a nano-scale sized surface texture onto at least part of the surface of said polymer so formed, the method comprising:

continuously depositing a polymer extrudate that is above its glass transition temperature from an extruder head onto a serially advancing lower moulding surface of a first mould;

heating the lower moulding surface, the heated lower moulding surface heated to a temperature to maintain the polymer extrudate above the glass transition temperature, the polymer extrudate being in or near a substantially liquid phase when being continuously deposited to the heated lower moulding surface, matching the linear speed of the polymer extrudate to the speed of the serially advancing lower moulding surface so that the deposited polymer extrudate is not moved with respect to the lower moulding surface, applying a serially advancing upper moulding surface of a second mould to at least an exposed upper surface of the polymer while the polymer is maintained at a temperature above the glass transition temperature, the lower and upper moulding surfaces forming a pressure forming zone, the temperature of the lower moulding surface remaining sufficiently high to keep the polymer entering the pressure forming zone above the glass transition temperature, and allowing the polymer to transition from above the glass transition temperature to below the glass transition temperature while within the pressure forming zone between the upper and lower moulding surfaces, and actively controlling heat removal from said polymer via at least one of said upper and lower moulding surfaces when said polymer is in said pressure forming zone, and transitioning said polymer from above the glass transition temperature to below the glass transition temperature whilst within the pressure forming zone; and wherein a plurality of heat sinks are provided for at least one of the upper and lower moulding surfaces, said heat sinks being spaced relative to each other along the pressure forming zone, wherein a heat sink more advanced through the pressure forming zone is controlled to a lower temperature than an adjacent heat sink less advanced through the pressure forming zone in order to progressively reduce the temperature of the polymer as it advances through the pressure forming zone;

removing the polymer from the moulding surfaces, after said actively controlled heat removal.

2. The method as claimed in claim 1, wherein a majority of the forming of the polymer occurs by the polymer assuming a nano-scale sized surface relief or pattern of the lower moulding surface when initially deposited onto the lower moulding surface, gravity assisting in moving the polymer into the first mould before any subsequent mechanical force is applied by a compression step of the upper moulding surface.

3. The method as claimed in claim 1, wherein the whole of the polymer to be formed remains above its glass transition temperature during at least the initial applying of a forming pressure onto said polymer between the upper and lower moulding surfaces.

4. The method as claimed in claim 1, wherein the moulding surfaces are each respectively part of a mould part that is thermally conductive.

5. The method as claimed in claim 1, wherein the lower moulding surface is temperature controllable for maintaining the polymer to be formed above its glass transition temperature at least prior to the step of applying the upper moulding surface.

6. The method as claimed in claim 1, wherein the upper and lower moulding surfaces are temperature controllable for controllably allowing the polymer so formed to reduce to below its glass transition temperature prior to removing of the polymer so formed from the moulding surfaces.

7. The method as claimed in claim 1, wherein the first mould is mounted to a first or lower platen.

8. The method as claimed in claim 1, wherein the second mould is mounted to a second or upper platen.

9. The method as claimed in claim 1, wherein the polymer assumes the shape of the lower moulding surface and upper moulding surface when above its glass transition temperature.

10. The method as claimed in claim 1, wherein a melt pump controls a flow rate of the polymer.

11. The method as claimed in claim 1, wherein the polymer, when above the glass transition temperature, is in the liquid phase.

12. The method as claimed in claim 1, wherein the moulding surfaces are at temperatures just above the glass transition temperature of the polymer to be formed when the polymer is initially located between the upper and lower moulding surface.

13. The method as claimed in claim 1, wherein the moulding surfaces are maintained at temperatures above the glass transition temperature of the polymer during the step of applying the upper moulding surface to at least the upper surface of the polymer.

14. The method as claimed in claim 1, wherein the upper moulding surface and lower moulding surface apply a moulding pressure to said polymer of up to about 500 kg/cm².

15. The method as claimed in claim 1, wherein the upper moulding surface and lower moulding surface apply a moulding pressure to said polymer of up to about 260 kg/cm².

16. The method as claimed in claim 1, wherein the upper moulding surface and lower moulding surface apply a moulding pressure to said polymer of up to about 60 kg/cm².

17. The method as claimed in claim 1, wherein the upper moulding surface and lower moulding surface apply a moulding pressure to said polymer in the range of about 1-200 kg/cm², 1-150, 1-100, 1-90, 1-80, 1-70, 1-60, 1-50, 1-40, 1-30, 1-20, 1-10, 1-9, 1-8, 1-7, 1-6, 1-5, 1-4, 1-3, 1-2, 1-1.5, 1-1.2 kg/cm².

18. The method as claimed in claim 1, wherein the upper moulding surface and lower moulding surface apply a moulding pressure to said polymer of less than about 1 kg/cm².

19. The method as claimed in claim 1, wherein the upper moulding surface and lower moulding surface apply a moulding pressure to said polymer of about 0.9, 0.8, 0.7, 0.6, 0.5, 0.4, 0.3, 0.2, 0.1 kg/cm².

20. The method as claimed in claim 1, wherein the polymer is a thermosetting or thermoplastic polymer.

21. The method as claimed in claim 1, wherein the polymer is selected from one of: polycarbonate, polystyrene, polymethyl methacrylate, Polypropylene, Acrylonitrile butadiene styrene, Polyester, Polyamides, Polyvinyl chloride, Polyurethanes, Polyvinylidene chloride, Polyethylene, Polytetrafluoroethylene, Polyetheretherketone, Polyetherketone, Polyetherimide, Ultem, Polylactic acid, aquilobutalstyrene, acrylics, rubbers, and phenolics.

22. The method as claimed in claim 1, wherein the upper moulding surface is applied to the polymer to apply pressure to said polymer by virtue of movement of the polymer between said two moulding surfaces.

23. The method as claimed in claim 22, wherein said lower moulding surface is supported by a conveyor.

24. The method as claimed in claim 22, wherein said upper moulding surface is supported by a conveyor.

25. The method as claimed in claim 22, wherein said lower moulding surface is supported and moved by a first conveyor and said upper moulding surface is supported and moved by a second conveyor that is located adjacent said first conveyor in order to position the upper moulding surface adjacent said lower moulding surface and move said lower and upper moulding surfaces through a pressure zone at where the polymer is subjected to pressure between said lower and upper moulding surfaces.

26. The method as claimed in claim 25, wherein the temperature of the lower moulding surface is actively controlled prior to the pressure zone.

27. The method as claimed in claim 25, wherein actively controlled heat removal occurs from said polymer via at least one of said upper and lower moulding surfaces, when said polymer is in said pressure zone, to transition said polymer from above its glass transition temperature to below its glass transition temperature within said pressure zone, at least by the virtue of the control of temperature of at least one of the lower and upper moulding surfaces.

28. The method as claimed in claim 25, wherein the temperature of at least one of said lower and upper moulding surfaces is actively controlled in said pressure zone.

29. The method as claimed in claim 28, wherein the temperature of the lower moulding surface is actively controlled prior to the pressure zone.

30. The method as claimed in claim 28, wherein actively controlled heat removal occurs from said polymer via at least one of said upper and lower moulding surfaces, when said polymer is in said pressure zone, to transition said polymer from above its glass transition temperature to below its glass transition temperature within said pressure zone, at least by the virtue of the control of temperature of at least one of the lower and upper moulding surfaces.

31. The method as claimed in claim 1, wherein the method is for continuously forming a polymer.

32. A polymer film or sheet that is formed by the method as claimed in claim 1, the polymer film or sheet including a nano scale sized surface texture comprising at least one dimension in the range of 0.1 to 1000 nm on at least one of its surfaces.

33. A method for forming two polymers to define a nano-scale sized surface texture onto at least part of the surface of at least one of the said polymers so formed, the method comprising:

heating each of a first polymer and a second polymer to temperatures above the respective glass transition temperature of each of the polymers;

continuously extruding the first of the polymers and depositing a first polymer extrudate onto a serially advancing lower moulding surface of a first mould, the first polymer extrudate remaining or being maintained above its glass transition temperature;

continuously extruding the second of the polymers and depositing a second polymer extrudate onto an exposed upper surface of the first polymer, the second polymer extrudate remaining or being maintained above its glass transition temperature heating the lower moulding surface, the heated lower moulding surface heated to a temperature to maintain the polymer extrudates above their respective glass transition temperature, the polymer extrudates being in or near a substantially liquid phase when being continuously deposited to the heated lower moulding surface, matching the linear speed of the polymer extrudates to the speed of the serially advancing lower moulding surface so that the deposited polymer extrudates are not moved with respect to the lower moulding surface, applying a serially advancing upper moulding surface of a second mould to at least an upper surface of the second polymer while each of the polymers are maintained at a temperature above their respective glass transition temperatures, the lower and upper moulding surfaces forming a pressure forming zone, the temperature of the lower moulding surface remaining sufficiently high to keep the polymers entering the pressure forming zone above their respective glass transition temperatures, and allowing the polymers to transition from above their respective glass transition temperature to below their respective glass transition temperature while held within the pressure forming zone between the upper and lower moulding surfaces, and actively controlling heat removal from said polymers via at least one of said upper and lower moulding surfaces when said polymers are in said pressure forming zone, and transitioning said polymers from above their respective glass transition temperatures to below their respective glass transition temperature whilst within the pressure forming zone; and wherein a plurality of heat sinks are provided for at least one of the upper and lower moulding surfaces, said heat sinks being spaced relative to each other along the pressure forming zone, wherein a heat sink more advanced through the pressure forming zone is controlled to a lower temperature than an adjacent heat sink less advanced through the pressure forming zone in order to progressively reduce the temperature of the polymers as they advance through the pressure forming zone;

removing the polymers, bonded together, from the upper and lower moulding surfaces, after said actively controlled heat removal.

34. The method as claimed in claim 33, wherein a majority of the forming of the polymers occurs by the polymers assuming a nano-scale sized surface relief or pattern of the lower moulding surface when initially deposited onto the lower moulding surface, gravity assisting in moving the polymers into the first mould before any subsequent mechanical force is applied by a compression step of the upper moulding surface.

35. The method as claimed in claim 33, wherein the whole of the polymers to be formed remain above their respective glass transition temperatures during at least the initial applying of a forming pressure onto said polymers between the upper and lower moulding surfaces.

36. The method as claimed in claim 33, wherein the moulding surfaces are each respectively part of a mould part that is thermally conductive.

37. The method as claimed in claim 33, wherein the lower moulding surface is temperature controllable for maintaining the polymers to be formed above their respective glass transition temperatures at least prior to the step of applying the upper moulding surface.

38. The method as claimed in claim 33, wherein the upper and lower moulding surfaces are temperature controllable for controllably allowing the polymers so formed to reduce to below their respective glass transition temperatures prior to removing of the polymers so formed from the moulding surfaces.

39. The method as claimed in claim 33, wherein the first mould is mounted to a first or lower platen.

40. The method as claimed in claim 33, wherein the second mould is mounted to a second or upper platen.

41. The method as claimed in claim 33, wherein the polymers assume the shape of the lower moulding surface and upper moulding surface when above their respective glass transition temperature.

42. The method as claimed in claim 33, wherein a melt pump controls a flow rate of the polymers.

43. The method as claimed in claim 33, wherein the polymers, when above the glass transition temperature, are in the liquid phase.

44. The method as claimed in claim 33, wherein the moulding surfaces are at temperatures just above the glass transition temperature of the polymers to be formed when the polymers are initially located between the upper and lower moulding surface.

45. The method as claimed in claim 33, wherein the moulding surfaces are maintained at temperatures above the glass transition temperature of the polymers during the step of applying an upper moulding surface to at least the upper surface of the upper-most polymer.

46. The method as claimed in claim 33, wherein the upper moulding surface and lower moulding surface apply a moulding pressure to said polymers of up to about 500 kg/cm$^2$.

47. The method as claimed in claim 33, wherein the upper moulding surface and lower moulding surface apply a moulding pressure to said polymers of up to about 260 kg/cm$^2$.

48. The method as claimed in claim 33, wherein the upper moulding surface and lower moulding surface apply a moulding pressure to said polymers of up to about 60 kg/cm².

49. The method as claimed in claim 33, wherein the upper moulding surface and lower moulding surface apply a moulding pressure to said polymers in the range of about 1-200 kg/cm², 1-150, 1-100, 1-90, 1-80, 1-70, 1-60, 1-50, 1-40, 1-30, 1-20, 1-10, 1-9, 1-8, 1-7, 1-6, 1-5, 1-4, 1-3, 1-2, 1-1.5, 1-1.2 kg/cm².

50. The method as claimed in claim 33, wherein the upper moulding surface and lower moulding surface apply a moulding pressure to said polymers of less than about 1 kg/cm².

51. The method as claimed in claim 33, wherein the upper moulding surface and lower moulding surface apply a moulding pressure to said polymers of about 0.9, 0.8, 0.7, 0.6, 0.5, 0.4, 0.3, 0.2, 0.1 kg/cm².

52. The method as claimed in claim 33, wherein at least one of the polymers is a thermosetting or thermoplastic polymer.

53. The method as claimed in claim 33, wherein at least one of the polymers is selected from one of: polycarbonate, polystyrene, polymethyl methacrylate, Polypropylene, Acrylonitrile butadiene styrene, Polyester, Polyamides, Polyvinyl chloride, Polyurethanes, Polyvinylidene chloride, Polyethylene, Polytetrafluoroethylene, Polyetheretherketone, Polyetherketone, Polyetherimide, Ultem, Polylactic acid, aquilobutalstyrene, acrylics, rubbers, and phenolics.

54. The method as claimed in claim 33, wherein the upper moulding surface is applied to the polymers to apply pressure to said polymers by virtue of movement of the polymers between said two moulding surfaces.

55. The method as claimed in claim 54, wherein said lower moulding surface is supported by a conveyor.

56. The method as claimed in claim 54, wherein said upper moulding surface is supported by a conveyor.

57. The method as claimed in claim 54, wherein said lower moulding surface is supported and moved by a first conveyor and said upper moulding surface is supported and moved by a second conveyor that is located adjacent said first conveyor in order to position the upper moulding surface adjacent said lower moulding surface and move said lower and upper moulding surfaces through a pressure zone at where the polymers are subjected to pressure between said lower and upper moulding surfaces.

58. The method as claimed in claim 57, wherein the temperature of the lower moulding surface is actively controlled prior to the pressure zone.

59. The method as claimed in claim 57, wherein actively controlled heat removal occurs from said polymers via at least one of said upper and lower moulding surfaces, when said polymers are in said pressure zone, to transition said polymers from above their respective glass transition temperatures to below their respective glass transition temperatures within said pressure zone, at least by the virtue of the control of temperature of at least one of the lower and upper moulding surfaces.

60. The method as claimed in claim 57, wherein the temperature of at least one of said lower and upper moulding surfaces is actively controlled in said pressure zone.

61. The method as claimed in claim 60, wherein the temperature of the lower moulding surface is actively controlled prior to the pressure zone.

62. The method as claimed in claim 60, wherein actively controlled heat removal occurs from said polymers via at least one of said upper and lower moulding surfaces, when said polymers are in said pressure zone, to transition said polymers from above their respective glass transition temperatures to below their respective glass transition temperatures within said pressure zone, at least by the virtue of the control of temperature of at least one of the lower and upper moulding surfaces.

63. The method as claimed in claim 33, wherein the method is for continuously forming a polymer.

64. A polymer film or sheet that is formed by the method as claimed in claim 33, the polymer film or sheet including a nano scale sized surface texture comprising at least one dimension in the range of 0.1 to 1000 nm on at least one of its surfaces.

65. A method for forming a plurality of polymers to define a nano-scale sized surface texture onto at least part of the surface of at least one of the said plurality of polymers so formed, the method comprising:
heating each of a plurality of polymers to temperatures above the respective glass transition temperature of each of the plurality of polymers;
the plurality of polymers comprising at least a first polymer, a second polymer and one or more additional polymer;
continuously extruding the first polymer and depositing a first polymer extrudate onto a serially advancing lower moulding surface of a first mould, the first polymer extrudate remaining or being maintained above its glass transition temperature;
continuously extruding the second polymer and depositing a second polymer extrudate onto an exposed surface of the first polymer, the second polymer extrudate remaining or being maintained above its glass transition temperature;
continuously extruding one or more additional polymer, each additional polymer extrudate being deposited onto an exposed surface of a preceding extrudate, each of the one or more additional polymer extrudates remaining or being maintained above their respective glass transition temperature;
heating the lower moulding surface, the heated lower moulding surface heated to a temperature to maintain the plurality of polymers above their respective glass transition temperatures, the polymer extrudates being in or near a substantially liquid phase when being continuously deposited to the heated lower moulding surface, or upon an exposed surface of a preceding polymer extrudate,
matching the linear speed of the first, second and one or more additional polymer extrudates to the speed of the serially advancing lower moulding surface so that the deposited polymer extrudates are not moved with respect to the lower moulding surface, and
applying a serially advancing upper moulding surface of a second mould to at least an upper surface of an uppermost polymer extrudate while each of the polymers are maintained at a temperature above their respective glass transition temperatures, the lower and upper moulding surfaces forming a pressure forming zone, the temperature of the lower moulding surface remaining sufficiently high to keep the polymers entering the pressure forming zone above their respective glass transition temperatures, and
allowing the polymers to transition from above their respective glass transition temperatures to below their respective glass transition temperature while held within the pressure forming zone between the upper and lower moulding surfaces, and actively controlling heat removal from said polymers via at least one of said upper and lower moulding surfaces when said polymers are in said pressure forming zone, and transitioning said polymers from above their respective glass transition temperatures to below their respective glass transition temperature whilst within the pressure forming zone; and wherein a plurality of heat sinks are provided for at least one of the upper and lower moulding surfaces, said heat sinks being spaced relative to each other along the pressure forming zone, wherein a heat sink more advanced through the pressure forming zone is controlled to a lower temperature than an adjacent heat sink less advanced through the pressure forming zone in order to progressively reduce the temperature of the polymers as they advance through the pressure forming zone;

removing the polymers, bonded together, from the upper and lower moulding surfaces, after said actively controlled heat removal.

66. The method as claimed in claim 65, wherein a majority of the forming of the polymers occurs by the polymers assuming a nano-scale sized surface relief or pattern of the lower moulding surface when initially deposited onto the lower moulding surface, gravity assisting in moving the polymers into the first mould before any subsequent mechanical force is applied by a compression step of the upper moulding surface.

67. The method as claimed in claim 65, wherein the whole of the polymers to be formed remain above their respective glass transition temperatures during at least the initial applying of a forming pressure onto said polymers between the upper and lower moulding surfaces.

68. The method as claimed in claim 65, wherein the moulding surfaces are each respectively part of a mould part that is thermally conductive.

69. The method as claimed in claim 65, wherein the lower moulding surface is temperature controllable for maintaining the polymers to be formed above their respective glass transition temperatures at least prior to the step of applying the upper moulding surface.

70. The method as claimed in claim 65, wherein the upper and lower moulding surfaces are temperature controllable for controllably allowing the polymers so formed to reduce to below their respective glass transition temperatures prior to removing of the polymers so formed from the moulding surfaces.

71. The method as claimed in claim 65, wherein the first mould is mounted to a first or lower platen.

72. The method as claimed in claim 65, wherein the second mould is mounted to a second or upper platen.

73. The method as claimed in claim 65, wherein the polymers assume the shape of the lower moulding surface and upper moulding surface when above their respective glass transition temperature.

74. The method as claimed in claim 65, wherein a melt pump controls a flow rate of the polymers.

75. The method as claimed in claim 65, wherein the polymers, when above the glass transition temperature, are in the liquid phase.

76. The method as claimed in claim 65, wherein the moulding surfaces are at temperatures just above the glass transition temperature of the polymers to be formed when the polymers are initially located between the upper and lower moulding surface.

77. The method as claimed in claim 65, wherein the moulding surfaces are maintained at temperatures above the glass transition temperature of the polymers during the step of applying an upper moulding surface to at least the upper surface of the upper-most polymer.

78. The method as claimed in claim 65, wherein the upper moulding surface and lower moulding surface apply a moulding pressure to said polymers of up to about 500 $kg/cm^2$.

79. The method as claimed in claim 65, wherein the upper moulding surface and lower moulding surface apply a moulding pressure to said polymers of up to about 260 $kg/cm^2$.

80. The method as claimed in claim 65, wherein the upper moulding surface and lower moulding surface apply a moulding pressure to said polymers of up to about 60 $kg/cm^2$.

81. The method as claimed in claim 65, wherein the upper moulding surface and lower moulding surface apply a moulding pressure to said polymers in the range of about 1-200 $kg/cm^2$, 1-150, 1-100, 1-90, 1-80, 1-70, 1-60, 1-50, 1-40, 1-30, 1-20, 1-10, 1-9, 1-8, 1-7, 1-6, 1-5, 1-4, 1-3, 1-2, 1-1.5, 1-1.2 $kg/cm^2$.

82. The method as claimed in claim 65, wherein the upper moulding surface and lower moulding surface apply a moulding pressure to said polymers of less than about 1 $kg/cm^2$.

83. The method as claimed in claim 65, wherein the upper moulding surface and lower moulding surface apply a moulding pressure to said polymers of about 0.9, 0.8, 0.7, 0.6, 0.5, 0.4, 0.3, 0.2, 0.1 $kg/cm^2$.

84. The method as claimed in claim 65, wherein at least one of the polymers is a thermosetting or thermoplastic polymer.

85. The method as claimed in claim 65, wherein at least one of the polymers is selected from one of: polycarbonate, polystyrene, polymethyl methacrylate, Polypropylene, Acrylonitrile butadiene styrene, Polyester, Polyamides, Polyvinyl chloride, Polyurethanes, Polyvinylidene chloride, Polyethylene, Polytetrafluoroethylene, Polyetheretherketone, Polyetherketone, Polyetherimide, Ultem, Polylactic acid, aquilobutalstyrene, acrylics, rubbers, and phenolics.

86. The method as claimed in claim 65, wherein the upper moulding surface is applied to the polymers to apply pressure to said polymers by virtue of movement of the polymers between said two moulding surfaces.

87. The method as claimed in claim 86, wherein said lower moulding surface is supported by a conveyor.

88. The method as claimed in claim 86, wherein said upper moulding surface is supported by a conveyor.

89. The method as claimed in claim 86, wherein said lower moulding surface is supported and moved by a first conveyor and said upper moulding surface is supported and moved by a second conveyor that is located adjacent said first conveyor in order to position the upper moulding surface adjacent said lower moulding surface and move said lower and upper moulding surfaces through a pressure zone at where the polymers are subjected to pressure between said lower and upper moulding surfaces.

90. The method as claimed in claim 89, wherein the temperature of the lower moulding surface is actively controlled prior to the pressure zone.

91. The method as claimed in claim 89, wherein actively controlled heat removal occurs from said polymers via at least one of said upper and lower moulding surfaces, when said polymers are in said pressure zone, to transition said polymers from above their respective glass transition temperatures to below their respective glass transition temperatures within said pressure zone, at least by the virtue of the control of temperature of at least one of the lower and upper moulding surfaces.

92. The method as claimed in claim 89, wherein the temperature of at least one of said lower and upper moulding surfaces is actively controlled in said pressure zone.

93. The method as claimed in claim 92, wherein the temperature of the lower moulding surface is actively controlled prior to the pressure zone.

94. The method as claimed in claim 92, wherein actively controlled heat removal occurs from said polymers via at least one of said upper and lower moulding surfaces, when said polymers are in said pressure zone, to transition said polymers from above their respective glass transition temperatures to below their respective glass transition temperatures within said pressure zone, at least by the virtue of the control of temperature of at least one of the lower and upper moulding surfaces.

95. The method as claimed in claim 65, wherein the method is for continuously forming a polymer.

96. A polymer film or sheet that is formed by the method as claimed in claim 65, the polymer film or sheet including a nano scale sized surface texture comprising at least one dimension in the range of 0.1 to 1000 nm on at least one of its surfaces.

* * * * *